United States Patent
Tanaka et al.

(10) Patent No.: US 10,164,713 B2
(45) Date of Patent: Dec. 25, 2018

(54) OPTICAL TRANSMITTER, OPTICAL MODULATOR MODULE, AND OPTICAL TRANSMISSION SYSTEM

(71) Applicants: FUJITSU LIMITED, Kawasaki-shi, Kanagawa (JP); Photonics Electronics Technology Research Association, Bunkyo-ku, Tokyo (JP)

(72) Inventors: Shinsuke Tanaka, Hiratsuka (JP); Tatsuya Usuki, Tsukuba (JP); Toshihiko Mori, Isehara (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/868,054

(22) Filed: Jan. 11, 2018

(65) Prior Publication Data
US 2018/0205465 A1   Jul. 19, 2018

(30) Foreign Application Priority Data
Jan. 13, 2017   (JP) .................................. 2017-004322

(51) Int. Cl.
H04B 10/00   (2013.01)
H04B 10/524   (2013.01)
G02F 1/025   (2006.01)

(52) U.S. Cl.
CPC ........... *H04B 10/524* (2013.01); *G02F 1/025* (2013.01); *G02F 2203/50* (2013.01)

(58) Field of Classification Search
CPC ...... H04B 10/524; H04B 10/503; G02F 1/025
(Continued)

(56) References Cited

U.S. PATENT DOCUMENTS 7,483,597 B2   1/2009   Shastri
8,744,219 B2   6/2014   Kato
(Continued)

FOREIGN PATENT DOCUMENTS

JP   5254984 B2   8/2013
JP   5729303 B2   6/2015

OTHER PUBLICATIONS

X. Wu, et al.; "A 200Gb/s NRZ/PAM-4 1V Transmitter in 40nm CMOS Driving a Si-Photonic Modulator in 0.13μm CMOS;" IEEE International Solid-State Circuits Conference (ISSCC) 2013, 7.7; 2013; pp. 128-129 and 1 Sheet Paper Continuations (3 Sheets total)/p. 2 of specification.
(Continued)

*Primary Examiner* — Tesfaldet Bocure
(74) *Attorney, Agent, or Firm* — Kratz, Quintos & Hanson, LLP

(57) ABSTRACT

An optical transmitter includes: a driving circuit that includes drivers each corresponding to a configuration bit of an input electrical data sequence; a MZ optical modulator that includes a first phase shifter provided in an arm and a second phase shifter provided in an arm; first capacitance elements that are electrically connected between the driving unit and the first phase shifter, each include an electric capacity weighted in response to a bit number of the configuration bit, and generate a first multilevel signal to be supplied to the first phase shifter; and second capacitance elements that are electrically connected between the driving circuit and the second phase shifter, each include an electric capacity weighted in response to a bit number of the configuration bit, and generate a second multilevel signal to be supplied to the second phase shifter.

11 Claims, 17 Drawing Sheets

(58) Field of Classification Search
USPC .......................................................... 398/189
See application file for complete search history.

(56) References Cited

U.S. PATENT DOCUMENTS

| | | | |
|---|---|---|---|
| 9,784,995 B2* | 10/2017 | Hauenschild | G02F 1/0121 |
| 2012/0308240 A1* | 12/2012 | Akiyama | H04B 10/5053 |
| | | | 398/141 |
| 2016/0269123 A1* | 9/2016 | Akiyama | H04B 10/5161 |
| 2017/0214469 A1* | 7/2017 | Nagarajan | H04B 10/524 |
| 2018/0054258 A1* | 2/2018 | Mori | H04B 10/548 |
| 2018/0109324 A1* | 4/2018 | Nagarajan | G02F 1/0123 |

OTHER PUBLICATIONS

M. Poulin, et al.; "107 Gb/s PAM-4 Transmission over 10 km Using a SiP Series Push-Pull Modulator at 1310 nm;" European Conference on Optical Communication (ECOC) 2014; Mo.4.5.3 (3 Sheets total)/p. 2 of specification.

T. Baba, et al.; "25-Gb/s broadband silicon modulator with 0.31-V•cm V(sub)πL based on forward-biased PIN diodes embedded with passive equalizer;" Optics Express; vol. 23; No. 26; Dec. 14, 2015; pp. 32950-32960 (11 Sheets total)/p. 2 of specification.

* cited by examiner

OPTICAL TRANSMITTER, OPTICAL MODULATOR MODULE, AND OPTICAL TRANSMISSION SYSTEM

CROSS-REFERENCE TO RELATED APPLICATION

This application is based upon and claims the benefit of priority of the prior Japanese Patent Application No. 2017-004322, filed on Jan. 13, 2017, the entire contents of which are incorporated herein by reference.

FIELD

The embodiments discussed herein are related to an optical transmitter, an optical modulator module, and an optical transmission system.

BACKGROUND

In recent optical fiber transmission, a multilevel modulated optical signal encoded in two bits or more per one symbol has been applied in place of a conventional binary modulated optical signal in order to cope with an increase in channel capacity. In an optical transmission system utilizing the multilevel modulated optical signal, there has been used a multilevel optical transmitter that generates a multilevel modulated optical signal from an input optical signal and an input electrical data sequence.
Patent Document 1: Japanese Patent No. 5729303
Patent Document 2: Japanese Patent No. 5254984
Non-Patent Document 1: X. Wu et al., "A 20 Gb/s NRZ/PAM-4 1V transmitter in 40 nm CMOS driving a Si-photonic modulator in 0.13 μm CMOS", IEEE International Solid-State Circuits Conference (ISSCC) 2013, 7.7
Non-Patent Document 2: Poulin et al., "107 Gb/s PAM-4 Transmission over 10 km Using a SiP Series Push-Pull Modulator at 1310 nm", European Conference on Optical Communication (ECOC) 2014, Mo. 4.5.3
Non-Patent Document 3: T. Baba et al., "25-Gb/s broadband silicon modulator with 0.31-V·cm VπL based on forward-biased PIN diodes embedded with passive equalizer" Optics Express, vol. 23, pp. 32950

The multilevel optical transmitter to be used for optical fiber transmission has a function of encoding transmission data into a multilevel signal and modulating the intensity and the phase of an optical signal by this multilevel signal to output the resultant optical signal applied thereto. There are some configuration examples of an optical modulator and a driving unit that perform the multilevel optical modulation. One of the examples is the combination of parallelized binary output drivers, which are equal to the number of bits of a multilevel signal, and a Mach-Zehnder (MZ) optical modulator into which segmented phase shifters are loaded (see Non-Patent Document 1, for example). In this case, waveform deterioration caused by nonlinearity of the optical modulator and the driving unit hardly occurs, and a low-power CMOS inverter can be applied to drivers of the driving unit. Therefore, the above-described example is a configuration effective for fabricating a high-performance and low-power optical transmitter.

FIG. 1 is a schematic diagram illustrating a typical configuration example of a conventional optical transmitter. FIG. 1 illustrates an optical transmitter of four-level pulse amplitude modulation (Pulse-Amplitude-Modulation 4: PAM4) that is the simplest among multilevel optical signals.

This optical transmitter is configured by including a driving circuit 101 and a MZ optical modulator 102. The driving circuit 101 includes a MSB driver 111 and a LSB driver 112 that are CMOS inverters to amplify binary signals of the MSB and the LSB being configuration bits of an input electrical data sequence, and output the amplified binary signals. The MZ optical modulator 102 has one end thereof set as an input portion of a DC light and has the other end thereof set as an output portion of a modulated light, and includes arms 115, 116 that are a pair of optical waveguides to separate from each other between a pair of optical couplers 113 and 114.

A first phase shifter 117a is loaded in the arm 115, and a second phase shifter 117b is loaded in the arm 116. The first phase shifter 117a is segmented into a first segmented phase shifter 117a1 and a second segmented phase shifter 117a2 so as to have a length thereof segmented at a ratio of 2:1 between the MSB side and the LSB side. The second phase shifter 117b is segmented into a first segmented phase shifter 117b1 and a second segmented phase shifter 117b2 so as to have a length thereof segmented at a ratio of 2:1 between the MSB side and the LSB side. Concretely, the first segmented phase shifters 117a1, 117b1 each have a length 2L, and the second segmented phase shifters 117a2, 117b2 each have a length L.

In this optical transmitter, an electrical signal, which is transmission data, is input to the MSB driver 111 and the LSB driver 112 in the driving unit 101 as a binary signal every MSB and LSB being the configuration bits of the input electrical data sequence. The MSB driver 111 and the LSB driver 112 each are a differential amplifier, and one of differential signals amplified in the MSB driver 111 is input to the first segmented phase shifter 117a1 and the other of the amplified differential signals is input to the first segmented phase shifter 117b1. One of differential signals amplified in the LSB driver 112 is input to the second segmented phase shifter 117a2 and the other of the amplified differential signals is input to the second segmented phase shifter 117b2. The first phase shifter 117a and the second phase shifter 117b each modulate an optical phase according to the differential signals supplied from the MSB driver 111 and the LSB driver 112.

Here, signal amplitudes of the electrical signals to be output from the MSB driver 111 and the LSB driver 112 are the same as one another, and the first segmented phase shifter 117a1 (117b1) and the second segmented phase shifter 117a2 (117b2) are the same as each other in an optical phase shift amount per unit length. Each phase shifter length of the first segmented phase shifter 117a1 (117b1) and the second segmented phase shifter 117a2 (117b2) is weighted. Therefore, the shift amount of the optical phase to be changed by the signal of the MSB and the shift amount of the optical phase to be changed by the signal of the LSB result in 2:1, and the following is obtained as the entire optical phase change $\phi(t)$.

$$\phi(t) = 2^1 \cdot MSB(t) + 2^0 \cdot LSB(t)$$

With $\phi(t)$, a modulated signal results in four values of 0, 1, 2, and 3. The MZ optical modulator 102 has a function of changing each phase change in the arms 115, 116 into an optical intensity change. Therefore, an output optical signal to be obtained consequently results in a four-level intensity-modulated signal (PAM4) responsive to $\phi(t)$.

The above-described optical transmitter needs to have a sufficiently long separated region between the first segmented phase shifter 117a1 (117b1) and the second segmented phase shifter 117a2 (117b2) in order to prevent mutual mixing of the respective electrical signals (see Non-Patent Document 2, for example).

Further, between the first segmented phase shifter 117a1 (117b1) and the second segmented phase shifter 117a2 (117b2), a phase shift associated with propagation of optical signals is caused. There is considered a case where signal timings are regulated at respective middle portions between the first segmented phase shifter 117a1 (117b1) and the second segmented phase shifter 117a2 (117b2) as illustrated in FIG. 1. In this case, the following is obtained as an optical signal delay τ between the first segmented phase shifter 117a1 (117b1) and the second segmented phase shifter 117a2 (117b2).

τ≈(1.5 L+Ls)·ng/c (L: first phase shifter length, Ls: separated region length, ng: optical mode group refractive index, c: light velocity)

In the case of L=500 μm, Ls=25 μm, and ng=4.0, τ=10 p seconds is satisfied.

FIG. 2 is a characteristic chart illustrating output waveforms of 25 Gbaud PAM4 obtained when the optical transmitter is driven with the MSB and the LSB set the same in timing without compensation for a signal delay.

As illustrated in FIG. 2, the rising timings at level transitions of 0, 1, 2, and 3 are each shifted by a signal delay between MSB transition and LSB transition. Due to this effect, an effective eye opening width common among three eye patterns in the signal waveform of PAM4 is narrowed to cause a problem when performing determination·decoding on the optical reception side. In order to solve such a problem, it is necessary to give a delay corresponding to the optical signal delay between the MSB driver and the LSB driver on the driving unit side. However, in order to constantly give a necessary delay amount while suppressing the effect of manufacturing variation, a delay amount varying mechanism, a monitor mechanism, and so on are needed, resulting in that problems of an increase in scale of the transmitter and an increase in power consumption resulting from this increase are caused.

SUMMARY

One aspect is an optical transmitter that generates a multilevel optical signal of two bits or more from an input optical signal and an input electrical data sequence, the optical transmitter including: a driving circuit configured to include drivers each corresponding to a configuration bit of the input electrical data sequence; an optical modulator configured to have a first optical waveguide and a second optical waveguide optically coupled to each other on an output side and includes a first phase shifter provided in the first optical waveguide and a second phase shifter provided in the second optical waveguide; first capacitance elements configured to be electrically connected between the driving circuit and the first phase shifter, each includes an electric capacity weighted in response to a bit number of the configuration bit, and generates a first multilevel signal to be supplied to the first phase shifter; and second capacitance elements configured to be electrically connected between the driving circuit and the second phase shifter, each includes an electric capacity weighted in response to a bit number of the configuration bit, and generates a second multilevel signal to be supplied to the second phase shifter.

One aspect is an optical modulator module that includes: a casing; an optical transmitter configured to be provided in the casing and generates a multilevel optical signal of two bits or more from an input optical signal and an input electrical data sequence; and a controller of the optical transmitter, in which the optical transmitter includes: a driving unit configured to include drivers each corresponding to a configuration bit of the input electrical data sequence; an optical modulator that has a first optical waveguide and a second optical waveguide optically coupled to each other on an output side and includes a first phase shifter provided in the first optical waveguide and a second phase shifter provided in the second optical waveguide; first capacitance elements configured to be electrically connected between the driving circuit and the first phase shifter, each includes an electric capacity weighted in response to a bit number of the configuration bit, and generate a first multilevel signal to be supplied to the first phase shifter; and second capacitance elements configured to be electrically connected between the driving circuit and the second phase shifter, each includes an electric capacity weighted in response to a bit number of the configuration bit, and generate a second multilevel signal to be supplied to the second phase shifter.

One aspect is an optical transmission system that includes: an optical transmitter configured to generate a transmission multilevel optical signal of two bits or more from an input optical signal and an input electrical data sequence; and an optical receiver configured to generate an output electrical data sequence from a reception multilevel optical signal of two bits or more, in which the optical transmitter includes: a driving circuit configured to include drivers each corresponding to a configuration bit of the input electrical data sequence; an optical modulator configured to have a first optical waveguide and a second optical waveguide optically coupled to each other on an output side and includes a first phase shifter provided in the first optical waveguide and a second phase shifter provided in the second optical waveguide; first capacitance elements configured to be electrically connected between the driving circuit and the first phase shifter, each includes an electric capacity weighted in response to a bit number of the configuration bit, and generates a first multilevel signal to be supplied to the first phase shifter; and second capacitance elements configured to be electrically connected between the driving circuit and the second phase shifter, each includes an electric capacity weighted in response to a bit number of the configuration bit, and generates a second multilevel signal to be supplied to the second phase shifter.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, preferred various embodiments will be explained in detail with reference to the drawings.

First Embodiment

Figure 3:
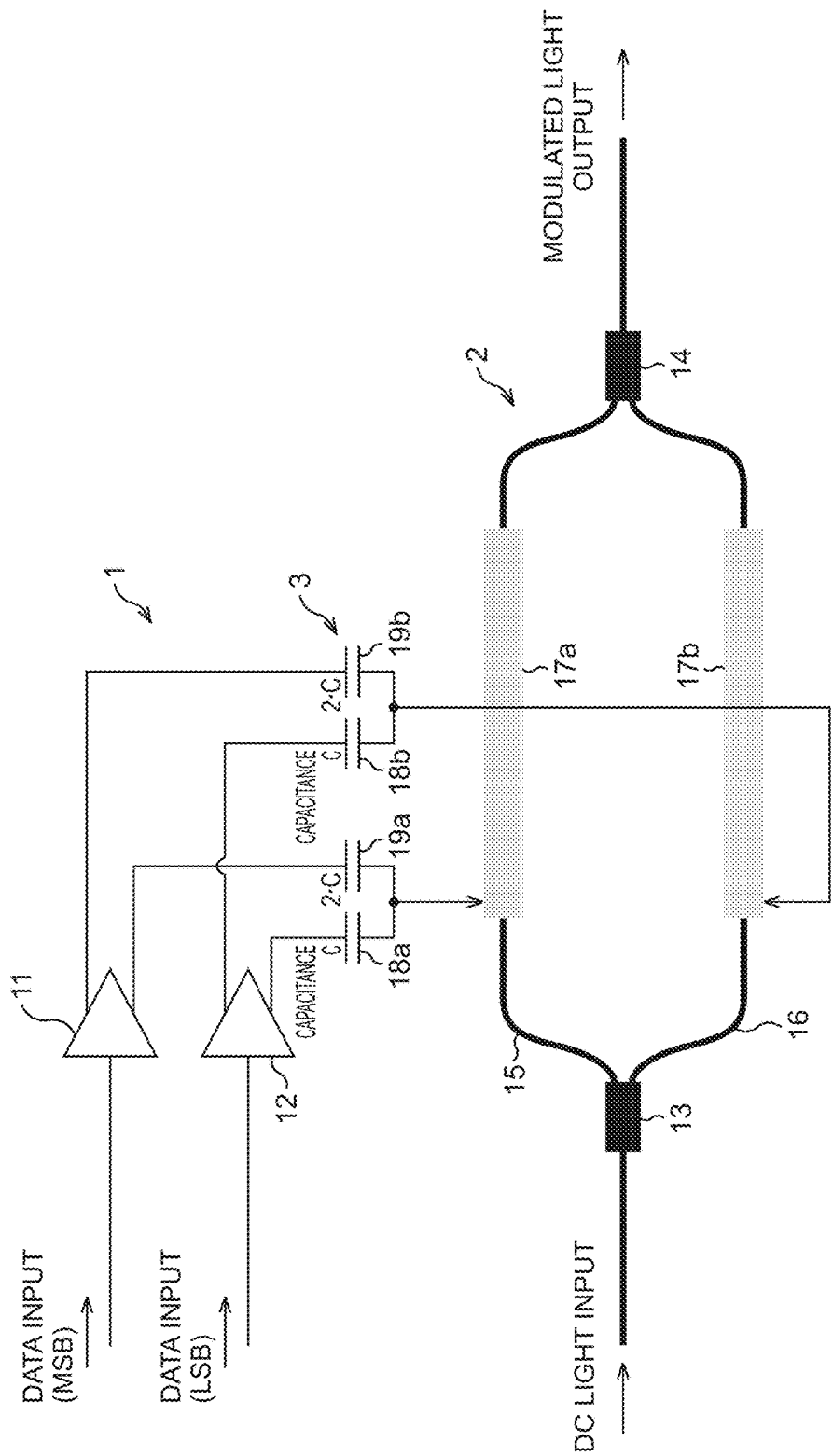
FIG. 3 is a schematic diagram illustrating a schematic configuration of an optical transmitter according to a first embodiment.

In this embodiment, there is explained as an example, a PAM4 optical transmitter that generates a multilevel modulated signal encoded in two bits or more, two bits here, per one symbol. FIG. 3 is a schematic diagram illustrating a schematic configuration of an optical transmitter according to a first embodiment.

This optical transmitter includes a driving circuit 1, a MZ optical modulator 2, and a capacitance unit 3.

The driving circuit 1 includes a MSB driver 11 and a LSB driver 12 that are CMOS inverters to amplify binary signals of the MSB and the LSB, which are configuration bits of an input electrical data sequence, and output the amplified binary signals.

The MZ optical modulator 2 has one end thereof set as an input portion of a DC light and has the other end thereof set as an output portion of a multilevel optical signal, and includes arms 15, 16 that are a pair of optical waveguides to separate from each other at an optical coupler 13 on the input side and optically couple to each other at an optical coupler 14 on the output side. A first phase shifter 17a is loaded in the arm 15, and a second phase shifter 17b is loaded in the arm 16. In this embodiment, the phase shifters 17a, 17b are the same in size and material, and each are an undivided single segment phase shifter.

The capacitance unit 3 includes first capacitance elements 18a, 19a and second capacitance elements 18b, 19b. The first capacitance elements 18a, 19a are electrically connected between the driving unit 1 and the phase shifter 17a, and each have an electric capacity weighted in response to a bit number of the configuration bit of the input electrical data sequence. The second capacitance elements 18b, 19b are electrically connected between the driving unit 1 and the phase shifter 17b, and each have an electric capacity weighted in response to a bit number of the configuration bit of the input electrical data sequence. That is, the capacitance elements 18a, 18b each have an electric capacity C ($2^0 \cdot C$) in response to the LSB, and the capacitance elements 19a, 19b each have an electric capacity 2C ($2^1 \cdot C$) weighted in response to the MSB.

In this optical transmitter, an electrical signal, which is transmission data, is input to the MSB driver 11 and the LSB driver 12 in the driving unit 1 as a binary signal every MSB and LSB being the configuration bits of the input electrical data sequence. The MSB driver 11 is electrically connected to the phase shifters 17a, 17b via the capacitance elements 19a, 19b, and the LSB driver 12 is electrically connected to the phase shifters 17a, 17b via the capacitance elements 18a, 18b. The MSB driver 11 and the LSB driver 12 each are a differential amplifier, and one of differential signals amplified in the MSB driver 11 is input to the first capacitance element 19a and the other of the amplified differential signals is input to the second capacitance element 19b. One of differential signals amplified in the LSB driver 12 is input to the first capacitance element 18a and the other of the amplified differential signals is input to the second capacitance element 18b. The ones of these differential signals are synthesized in the first capacitance elements 18a, 19a to be a multilevel signal (first multilevel signal), and it is supplied to the first phase shifter 17a. The others of these differential signals are synthesized in the second capacitance elements 18b, 19b to be a multilevel signal (second multilevel signal), and it is supplied to the second phase shifter 17b. The phase shifters 17a, 17b modulate each optical phase according to the multilevel signals supplied from the MSB driver 11 and the LSB driver 12 respectively.

Figure 1:
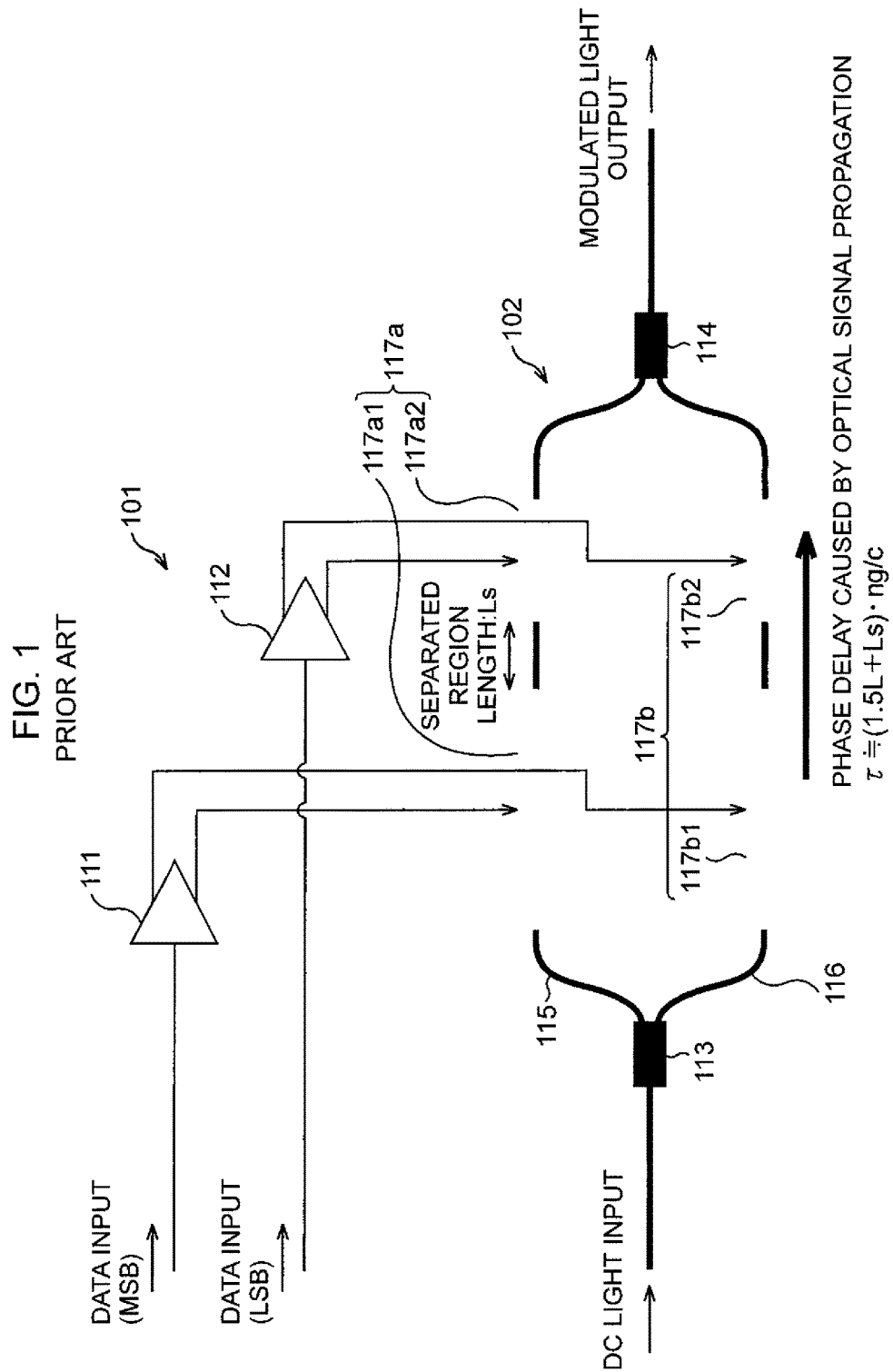
FIG. 1 is a schematic diagram illustrating a typical configuration example of a conventional optical transmitter.

Here, the phase shifters 17a, 17b each are set to a single segment (each only need to have a length 3L in order to obtain the same degree of modulation as the optical transmitter illustrated in FIG. 1). The MSB driver 11 and the LSB driver 12 taking charge of the respective configuration bits are connected in parallel to the first phase shifter 17a via the first capacitance elements 18a, 19a. Similarly, the MSB driver 11 and the LSB driver 12 taking charge of the respective configuration bits are connected in parallel to the second phase shifter 17b via the second capacitance elements 18b, 19b. Therefore, a shift amount of the optical phase to be changed by the signal of the MSB and a shift amount of the optical phase to be changed by the signal of the LSB result in 2C: C=2:1, and the following is obtained as the entire optical phase change φ(t).

$$\phi(t) = 2^1 \cdot MSB(t) + 2^0 \cdot LSB(t)$$

With φ(t), the modulated signal results in four values of 0, 1, 2, and 3. The MZ optical modulator 2 has a function of changing each phase change in the arms 15, 16 into an optical intensity change. An output optical signal to be obtained consequently results in four-level PAM4 responsive to φ(t).

In the optical transmitter according to this embodiment, the respective binary signals of the MSB and the LSB are synthesized into the multilevel signal beforehand via the first capacitance elements 18a, 19a to be input to the single first phase shifter 17a. Similarly, the respective binary signals of the MSB and the LSB are synthesized into the multilevel signal beforehand via the second capacitance elements 18b, 19b to be input to the single second phase shifter 17b. This configuration prevents a signal delay from occurring in the phase shifters 17a, 17b, and does not need to adjust the signal delay between segmented phase shifters, which has been the problem in the prior arts. Therefore, it is not necessary to provide various mechanisms intended for the delay amount adjustment, resulting in that it is possible to fundamentally avoid the increase in scale of the transmitter and the increase in power consumption resulting from this increase, which have been the problems in the prior arts.

In this example, line lengths of internal signal lines are designed to be equal to each other between the MSB driver 11 and the LSB driver 12. Further, the line length of the signal line where the signals are output from the drivers 11, 12 and pass through the first capacitance elements 18a, 19a to be synthesized and the line length of the signal line where the signals are output from the drivers 11, 12 and pass through the second capacitance elements 18b, 19b to be synthesized are designed to be equal to each other. This makes it possible to generate the multilevel signals with no timing differences between the phase shifters 17a, 17b without performing a special phase adjustment.

As explained above, according to the optical transmitter in this embodiment, since segmenting of the phase shifters is not needed, the optical transmission of high-quality multilevel optical signals is performed without occurrence of the signal delay resulting from segmenting.

EXAMPLES

Hereinafter, there are explained more concrete configurations of the optical transmitter according to the first embodiment as various examples.

Example 1

Figure 4:
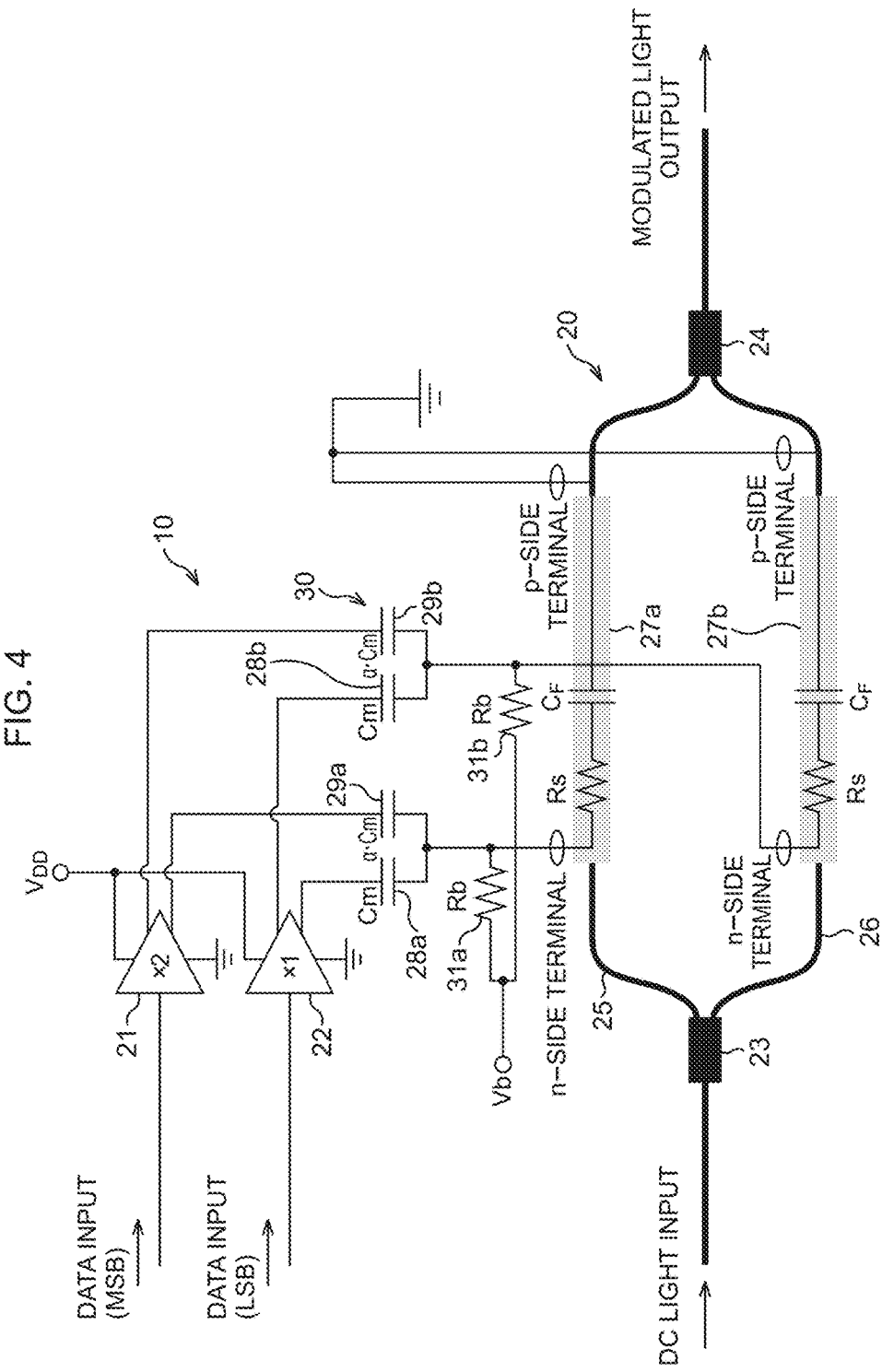
FIG. 4 is a schematic diagram illustrating a schematic configuration of an optical transmitter according to an example 1 of the first embodiment.

FIG. 4 is a schematic diagram illustrating a schematic configuration of an optical transmitter according to an example 1 of the first embodiment.

This optical transmitter includes a driving unit 10, a MZ optical modulator 20 formed on a Si substrate being a semiconductor substrate, a capacitance unit 30, a first resistance element 31a, and a second resistance element 31b.

The driving unit 10 includes a MSB driver 21 and a LSB driver 22 that are CMOS inverters to amplify binary signals of the MSB and the LSB, which are configuration bits of an input electrical data sequence, and output the amplified binary signals. The MSB driver 21 and the LSB driver 22 each have its driver size weighted according to a corresponding bit number similarly to capacitance elements in the capacitance unit 30. The MSB driver 21 has a size of ×2, and the LSB driver 22 has a size of ×1. Employing this configuration enables a total output impedance Z of the MSB driver 21, the LSB driver 22, and the capacitance elements of the capacitance unit 30 to be weighted precisely so as to satisfy $Z_{MSB}:Z_{LSB}=2:1$. This makes it possible to generate high-quality multilevel optical waveforms because a driving amplitude ratio of MSB:LSB is precisely specified to be 2:1 and operating bands of both MSB and LSB driving systems are made equal to each other.

The MZ optical modulator 20 has one end thereof set as an input portion of a DC light and has the other end thereof set as an output portion of a multilevel optical signal, and includes arms 25, 26 that are a pair of optical waveguides to separate from each other at an optical coupler 23 on the input side and optically couple to each other at an optical coupler 24 on the output side. A first phase shifter 27a is loaded in the arm 25, and a second phase shifter 27b is loaded in the arm 26. In this embodiment, the phase shifters 27a, 27b are the same in size, (which is about 1500 μm in length, for example), and material, and each are an undivided single segment phase shifter. Low-speed phase shifters (not illustrated) are amounted in the MZ optical modulator 20 and are adjusted so that the phase difference in the DC light between the arms 25 and 26 becomes π/4 to obtain the maximum modulation amplitude.

Figure 5:
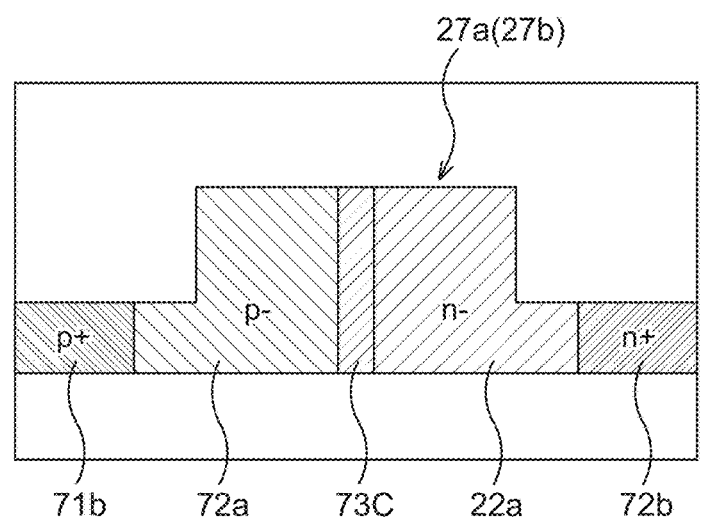
FIG. 5 is a transverse cross-sectional view illustrating a schematic structure of a phase shifter of the optical transmitter according to the example 1 of the first embodiment.

The phase shifters 27a, 27b each have a rib transverse cross-sectional shape, as illustrated in FIG. 5, in which a p⁻ region 71a and a p⁺ region 71b and an n⁻ region 72a and an n⁺ region 72b form a pn junction and a depletion layer 73 is formed between the p⁻ region 71a and the n⁻ region 72a. The phase shifters 27a, 27b individually have one terminal on each of the p side and the n side (not illustrated). Each synthesized multilevel signal is input to the n-side terminals of the phase shifters 27a, 27b, and the opposite p-side terminals are connected to a ground potential. The phase shifters 27a, 27b are each exhibited as an equivalent circuit composed of an equivalent resistance Rs and an equivalent capacitance $C_F$. In the case of the phase shifters 27a, 27b each being 1500 μm in length, Rs=5Ω and $C_F$=600 fF are satisfied. The equivalent capacitance $C_F$ of the first phase shifter 27a is smaller than capacitances Cm, αCm of first capacitance elements 28a, 29a. The equivalent capacitance $C_F$ of the second phase shifter 27b is smaller than capacitances Cm, α Cm of second capacitance elements 28b, 29b. That is, the operating band in the optical transmitter in this example is determined by an RC time constant by Rs·$C_F$.

The capacitance unit 30 includes the first capacitance elements 28a, 29a, and the second capacitance elements 28b, 29b. The first capacitance elements 28a, 29a are electrically connected between the driving unit 1 and the first phase shifter 27a, and each have an electric capacity weighted in response to a bit number of the configuration bit of the input electrical data sequence. The second capacitance elements 28b, 29b are electrically connected between the driving unit 1 and the second phase shifter 27b, and each have an electric capacity weighted in response to a bit number of the configuration bit of the input electrical data sequence. That is, the capacitance elements 28a, 28b each have an electric capacity C in response to the LSB, and the capacitance elements 29a, 29b each have an electric capacity αCm, which is the resultant of Cm being weighted by α in response to the MSB.

Here, each electric capacity Cm of the capacitance elements 28a, 28b corresponding to the LSB is 2.2 pF, and each electric capacity αCm of the capacitance elements 29a, 29b corresponding to the MSB is 4.4 pF being 2×2.2 pF. Further, the capacitance elements 28a, 28b, 29a, and 29b are set so that each impedance becomes sufficiently low over the entire frequency band that the input electrical data sequence has.

The first resistance element 31a is electrically connected in series between the first capacitance elements 28a, 29a and the first phase shifter 27a. The second resistance element 31*b* is electrically connected in series between the second capacitance elements 28*b*, 29*b* and the second phase shifter 27*b*. A bias voltage Vb (for example, 1.0V) is applied between the first capacitance elements 28*a*, 29*a* and the first phase shifter 27*a* via the first resistance element 31*a* (for example, 10 kΩ). A bias voltage Vb (for example, 1.0 V) is applied between the second capacitance elements 28*b*, 29*b* and the second phase shifter 27*b* via the second resistance element 31*b* (for example, 10 kΩ). This configuration enables the bias voltage Vb to be applied to each of the phase shifters 27*a*, 27*b*, each of which is formed by the pn junction, resulting in that it is possible to obtain a sufficient operating band.

In the optical transmitter, the input electrical data sequence is input to the MSB driver 21 and the LSB driver 22 in the driving unit 10 as a binary signal every MSB and LSB, which are the configuration bits of the input electrical data sequence. In the driving unit 10, the MSB driver 21 and the LSB driver 22 each amplify the binary signal to output differential signals having an amplitude of a power supply voltage $V_{DD}$=0.9 V. One of the differential signals amplified in the MSB driver 21 is input to the first capacitance element 29*a*, and the other of the amplified differential signals is input to the second capacitance element 29*b*. One of the differential signals amplified in the LSB driver 22 is input to the first capacitance element 28*a*, and the other of the amplified differential signals is input to the second capacitance element 28*b*. The ones of these differential signals are synthesized in the first capacitance elements 28*a*, 29*a* to be a multilevel signal (first multilevel signal), and it is supplied to the first phase shifter 27*a*. The others of these differential signals are synthesized in the second capacitance elements 28*b*, 29*b* to be a multilevel signal (second multilevel signal, and it is supplied to the second phase shifter 27*b*. The phase shifters 27*a*, 27*b* modulate each optical phase according to the multilevel signals supplied from the MSB driver 21 and the LSB driver 22 respectively to perform a push-pull operation.

In the optical transmitter according to the this example, the respective binary signals of the MSB and the LSB are synthesized into the multilevel signal beforehand via the first capacitance elements 28*a*, 29*a* to be input to the single first phase shifter 27*a*. Similarly, the respective binary signals of the MSB and the LSB are synthesized into the multilevel signal beforehand via the second capacitance elements 28*b*, 29*b* to be input to the single second phase shifter 27*b*. This configuration prevents a signal delay from occurring in the phase shifters 27*a*, 27*b*, and does not need to adjust the signal delay between segmented phase shifters, which has been the problem in the prior arts. Therefore, it is not necessary to provide various mechanisms intended for the delay amount adjustment, resulting in that it is possible to fundamentally avoid the increase in scale of the transmitter and the increase in power consumption resulting from this increase, which have been the problems in the prior arts.

In this example, line lengths of internal signal lines are designed to be equal to each other between the MSB driver 21 and the LSB driver 22. Further, the line length of the signal line where the signals are output from the drivers 21, 22 and pass through the first capacitance elements 28*a*, 29*a* to be synthesized and the line length of the signal line where the signals are output from the drivers 21, 22 and pass through the second capacitance elements 28*b*, 29*b* to be synthesized are designed to be equal to each other. This makes it possible to generate the multilevel signals with no timing differences between the phase shifters 27*a*, 27*b* without performing a special phase adjustment.

Figure 6:
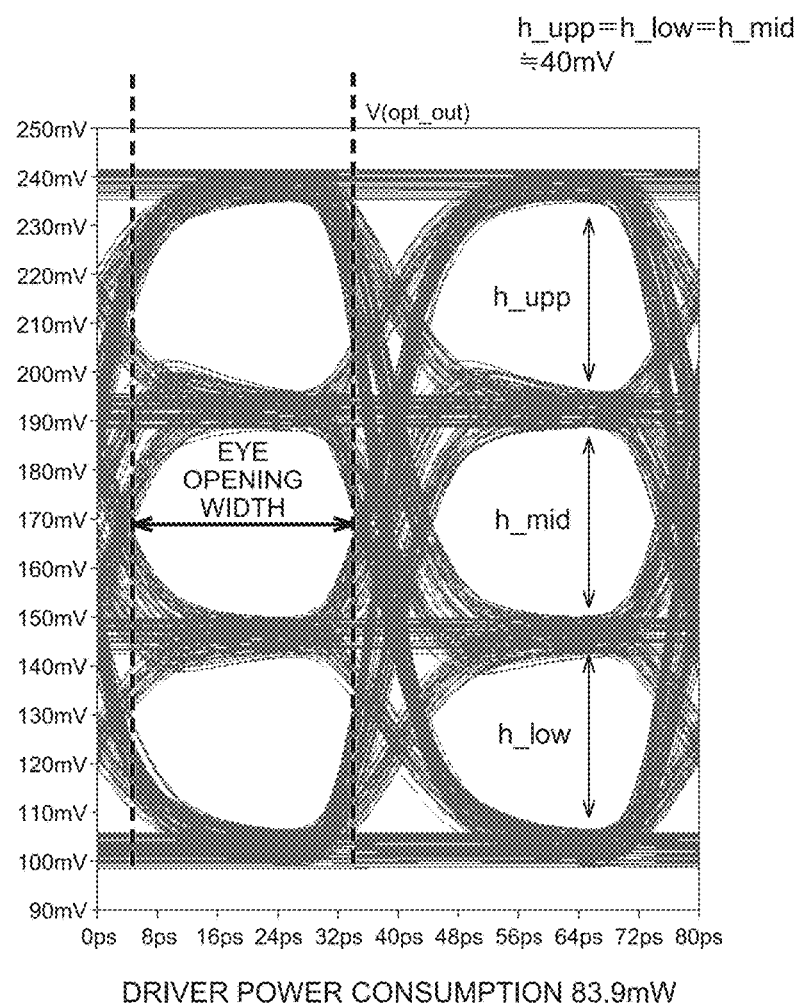
FIG. 6 is a characteristic chart illustrating output waveforms of PAM4 in the optical transmitter according to the example 1 of the first embodiment.

FIG. 6 is a characteristic chart illustrating output waveforms of 25 Gbaud PAM4 in the optical transmitter according to the example 1 of the first embodiment.

FIG. 6 illustrates output waveforms resulting from conversion of the optical output in response to the input of a 1-mW DC optical signal to the optical transmitter in this example into an electrical signal in an optical detector with a light-receiving efficiency of 1.0 A/W and a receiving circuit with an input impedance of 1 kΩ, and 1 mV on the vertical axis is equivalent to a 1-µW optical signal.

Figure 2:
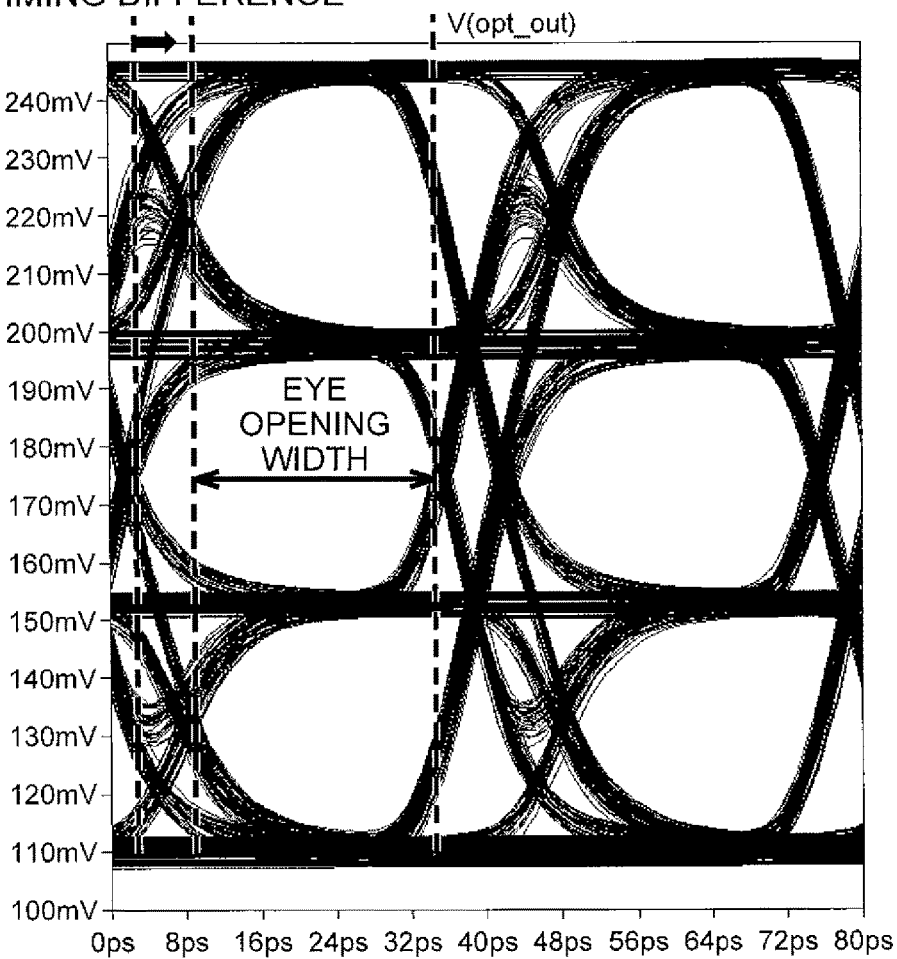
FIG. 2 is a characteristic chart illustrating output waveforms of PAM4 obtained when the optical transmitter in FIG. 1 is driven without compensation for a signal delay.

The binary signals of the MSB and the LSB are synthesized to obtain output waveforms multivalued to four levels. The timings of respective data transitions are adjusted to be uniform without a special delay adjustment, and as compared to the output waveforms illustrated in FIG. 2, a sufficiently wide effective eye opening width is secured. The respective eye openings are equal in height, which is 40 mV or so (=in optical amplitude, which is 40 µm or so), and high-quality modulated optical waveforms of PAM4 are obtained. The power consumption in the driving unit 10 at this time is 83.9 mW, resulting in that a PAM4 optical transmitter having a very low power consumption is fabricated.

Figure 7:
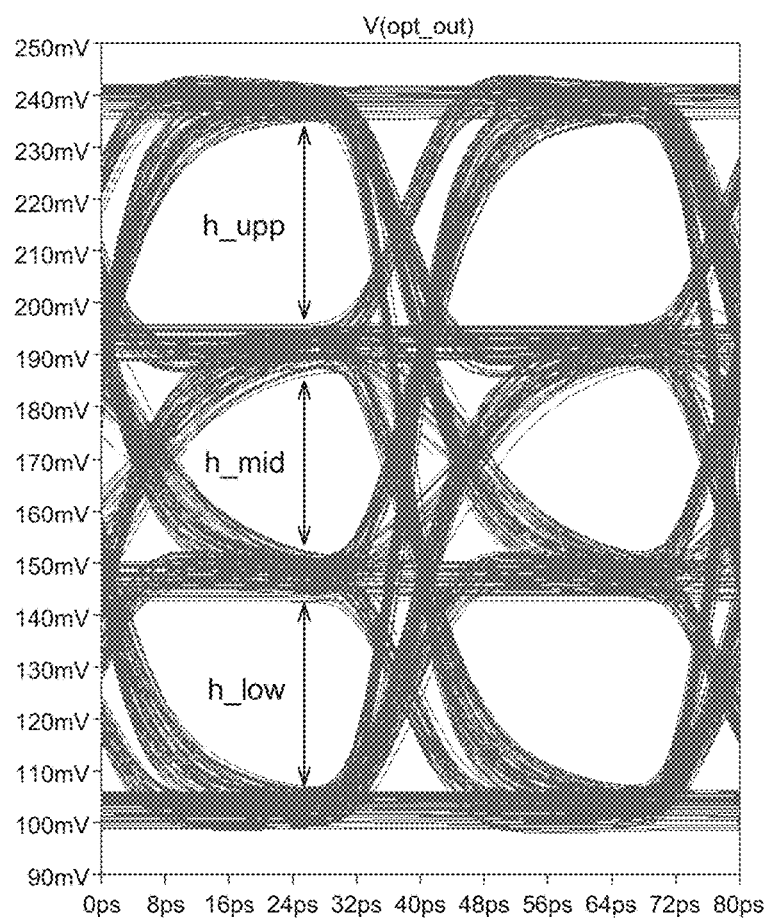
FIG. 7 is a characteristic chart illustrating output waveforms of PAM4 of the case where a driver size ratio between a MSB driver and a LSB driver is set to 1:1 in the example 1 as a comparative example of the example 1 of the first embodiment.

FIG. 7 is a characteristic chart illustrating output waveforms of PAM4 of the case where the driver size ratio between the MSB driver 11 and the LSB driver 12 in the example 1 is set to 1:1 as a comparative example of the example 1 of the first embodiment.

In this case, it is possible to obtain optical outputs multiplexed to four levels, but three eye opening heights are not uniform and the middle eye height h_mid is smaller than the upper and lower eye heights h_upp and h_low, resulting in that waveforms to be disadvantageous at a decoding time are formed. Further, rising/falling times and timings of respective transitions do not become uniform and particularly the middle eye opening width is narrowed.

As explained above, according to the optical transmitter of this example, since segmenting of the phase shifters is not needed, the optical transmission of high-quality multilevel optical signals is performed without occurrence of the signal delay resulting from segmenting.

Example 2

Figure 8:
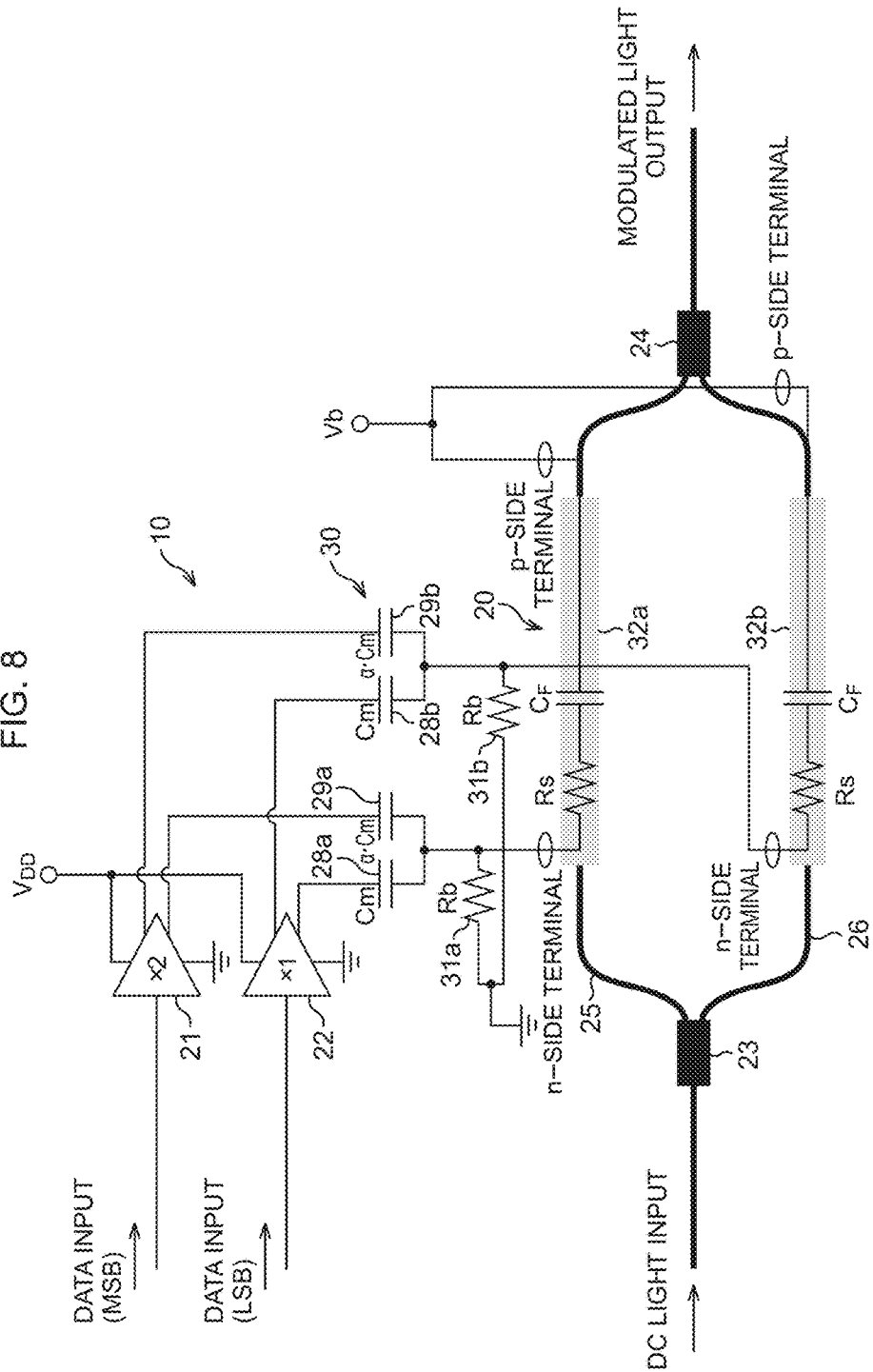
FIG. 8 is a schematic diagram illustrating a schematic configuration of an optical transmitter according to an example 2 of the first embodiment.

FIG. 8 is a schematic diagram illustrating a schematic configuration of an optical transmitter according to an example 2 of the first embodiment.

This optical transmitter is configured by including: a driving unit 10; a MZ optical transmitter 20 formed on a Si substrate being a semiconductor substrate; a capacitance unit 30; a first resistance element 31*a*; and a second resistance element 31*b*. The first resistance element 31*a* and the second resistance element 31*b* are grounded at a common end.

The driving unit 10 includes a MSB driver 21 and a LSB driver 22 that are CMOS inverters to amplify binary signals of the MSB and the LSB, which are configuration bits of an input electrical data sequence, and output the amplified binary signals. The MSB driver 21 and the LSB driver 22 each have its driver size weighted according to a corresponding bit number similarly to capacitance elements in the capacitance unit 30. The MSB driver 21 has a size of ×2, and the LSB driver 22 has a size of ×1. Employing this configuration enables a total output impedance Z of the MSB driver 21, the LSB driver 22, and the capacitance elements of the capacitance unit 30 to be weighted precisely so as to satisfy $Z_{MSB}:Z_{LSB}$=2:1. This makes it possible to generate high-quality multilevel optical waveforms because a driving amplitude ratio of MSB:LSB is precisely specified to be 2:1 and operating bands of both MSB and LSB driving systems are made equal to each other.

The MZ optical modulator 20 has one end thereof set as an input portion of a DC light and has the other end thereof set as an output portion of a multilevel optical signal, and includes arms 25, 26 that are a pair of optical waveguides to separate from each other at an optical coupler 23 on the input side and optically couple to each other at an optical coupler 24 on the output side. A first phase shifter 32a is loaded in the arm 25, and a second phase shifter 32b is loaded in the arm 26. In this embodiment, the phase shifters 32a, 32b are the same in size, (which is about 750 μm in length, for example), and material, and each are an undivided single segment phase shifter. Low-speed phase shifters (not illustrated) are amounted in the MZ optical modulator 20 and are adjusted so that the phase difference in the DC light between the arms 25 and 26 becomes π/4 to obtain the maximum modulation amplitude.

Figure 9:
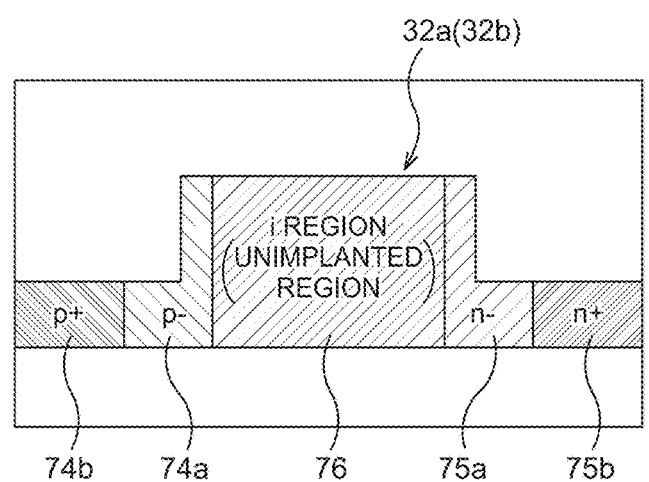
FIG. 9 is a transverse cross-sectional view illustrating a schematic structure of a phase shifter of the optical transmitter according to the example 2 of the first embodiment.

The phase shifters 32a, 32b each have a rib transverse cross-sectional shape, as illustrated in FIG. 9, in which a p⁻ region 74a and a p⁺ region 74b and an n⁻ region 75a and an n⁺ region 75b form a pin structure with an i region (unimplanted region) 76 being sandwiched therebetween.

The phase shifters 32a, 32b individually have one terminal on each of the p side and the n side (not illustrated). Each synthesized multilevel signal is input to the n-side terminals and their DC potentials are connected to a ground potential via the resistance elements 31a, 31b. The p-side terminals are connected to a bias circuit and a bias current necessary for operation is supplied from a bias voltage of Vb=1.35 V. The phase shifters 32a, 32b having a pin structure each have a forward bias applied to a pin junction diode formed in the optical waveguide to accumulate carriers, and change an optical phase by a carrier plasma effect. The phase shifters 32a, 32b are much larger in equivalent capacitance $C_F$ as compared to the pn-type phase shifters 27a, 27b of the example 1, and at the same time, are also much larger in phase modulation efficiency (unit voltage amplitude, phase shift amount obtained in a unit length). Incidentally, also in the pn-type phase shifters 27a, 27b in the example 1, application of a forward bias makes it possible to obtain the same operation as that of the phase shifters 32a, 32b.

The phase shifters 32a, 32b are each exhibited as an equivalent circuit composed of an equivalent resistance Rs and an equivalent capacitance $C_F$. In the case of the phase shifters 32a, 32b each being 750 μm in length, Rs=4Ω and $C_F$=50 pF are satisfied. The equivalent capacitance $C_F$ of the phase shifter 32a is larger than capacitances Cm, αCm of first capacitance elements 28a, 29a. The equivalent capacitance $C_F$ of the phase shifter 32b is larger than capacitances Cm, αCm of second capacitance elements 28b, 29b. That is, the operating band in the optical transmitter in this example is determined by an RC time constant by Rs·Cm, and Cm is set to be sufficiently small so as to obtain a necessary operating band.

The capacitance unit 30 includes the first capacitance elements 28a, 29a, and the second capacitance elements 28b, 29b. The first capacitance elements 28a, 29a are electrically connected between the driving unit 10 and the first phase shifter 32a, and each have an electric capacity weighted in response to a bit number of the configuration bit of the input electrical data sequence. The second capacitance elements 28b, 29b are electrically connected between the driving unit 10 and the second phase shifter 32b, and each have an electric capacity weighted in response to a bit number of the configuration bit of the input electrical data sequence. That is, the capacitance elements 28a, 28b each have an electric capacity Cm in response to the LSB, and the capacitance elements 29a, 29b each have an electric capacity αCm, which is the resultant of Cm being weighted by α, in response to the MSB.

Here, the electric capacity Cm of the capacitance elements 28a, 28b corresponding to the LSB is 0.5 pF, and the electric capacity αCm of the capacitance elements 29a, 29b corresponding to the MSB is 1.0 pF being 2×0.5 pF. Further, the capacitance elements 28a, 28b, 29a, and 29b are set so that each impedance becomes sufficiently low over the entire frequency band that the input electrical data sequence has.

In this optical transmitter, the input electrical data sequence is input to the MSB driver 21 and the LSB driver 22 in the driving unit 10 as a binary signal every MSB and LSB, which are the configuration bits of the input electrical data sequence. In the driving unit 10, the MSB driver 21 and the LSB driver 22 each amplify the binary signal to output differential signals having an amplitude of a power supply voltage $V_{DD}$=0.9 V. One of the differential signals amplified in the MSB driver 21 is input to the first capacitance element 29a, and the other of the amplified differential signals is input to the second capacitance element 29b. One of the differential signals amplified in the LSB driver 22 is input to the first capacitance element 28a, and the other of the amplified differential signals is input to the second capacitance element 28b. The ones of these differential signals are synthesized in the first capacitance elements 28a, 29a to be a multilevel signal (first multilevel signal), and it is supplied to the first phase shifter 32a. The others of these differential signals are synthesized in the second capacitance elements 28b, 29b to be a multilevel signal (second multilevel signal), and it is supplied to the second phase shifter 32b. The phase shifters 32a, 32b modulate each optical phase according to the multilevel signals supplied from the MSB driver 21 and the LSB driver 22 respectively to perform a push-pull operation.

Figure 10:
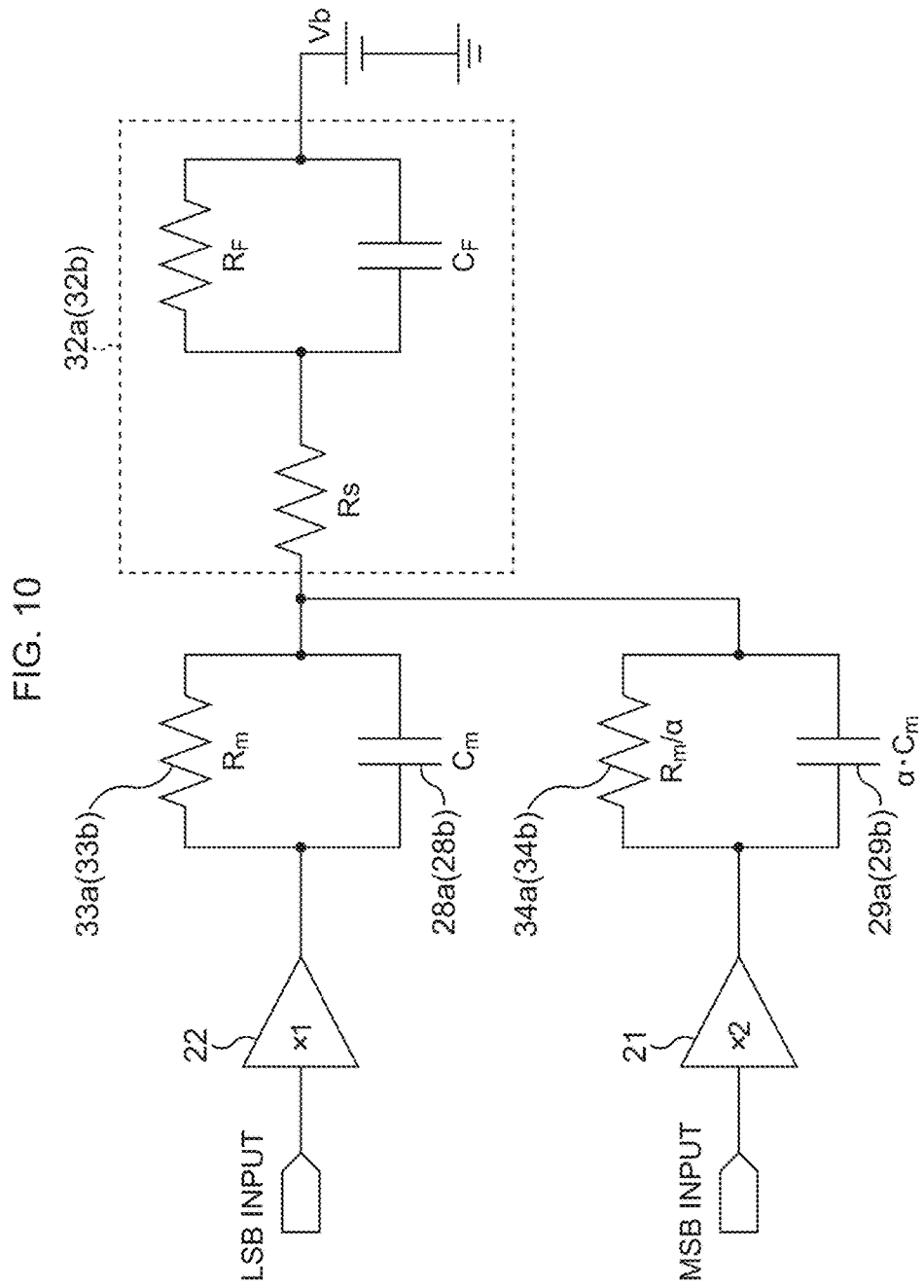
FIG. 10 is a schematic diagram illustrating one arm as a circuit configuration of the case where a method is applied to the example 2 of the first embodiment.

In this example, such a method as below is preferably applied in order to make the responsivity from a low-frequency region to a high-frequency region in the optical transmitter uniform (see Non-Patent Document 3, for example). FIG. 10 is a schematic diagram illustrating one of the arms as a circuit configuration of the case where the above method is applied to the example 2. A third resistance element 33a having a resistance weighted inversely to the weighting of the first capacitance element 28a and a third resistance element 34a having a resistance weighted inversely to the weighting of the first capacitance element 29a are connected in parallel to the first capacitance elements 28a, 29a respectively. A fourth resistance element 33b having a resistance weighted inversely to the weighting of the second capacitance element 28b and a fourth resistance element 34b having a resistance weighted inversely to the weighting of the second capacitance element 29b are connected in parallel to the second capacitance elements 28b, 29b respectively. Here, the resistance elements 33a, 33b (resistance Rm) are added in parallel to the capacitance elements 28a, 28b (electric capacity Cm) respectively, and the resistance elements 34a, 34b (resistance Rm/α) are added in parallel to the capacitance elements 29a, 29b (electric capacity αCm) respectively. Further, in each of the equivalent circuits of the phase shifters 32a, 32b, a resistance $R_F$ is added in parallel to $C_F$.

In the above-described configuration, responsivity η_h in the high-frequency region (f>1/(2 $\pi R_F C_F$)) on the LSB side is expressed as η_h∝Cm/($C_F$+Cm) by Cm and $C_F$. On the other hand, responsivity η_l in the low-frequency region ($f<1/(2\pi R_F C_F)$) is expressed as $\eta\_2 \propto R_F/(R_F+Rm)$ by Rm and $R_F$. Thus, in order to equalize the responsivities in the both frequency regions to obtain uniform responsivity, it is only necessary to set Rm so as to satisfy $\eta\_h \approx \eta\_1$, namely $R_F C_F \approx RmCm$. Concretely, $R_F$ in the phase shifters 32a, 32b having a pin structure in the example 2 is 25Ω, and thus setting Rm to 3.4 kΩ makes it possible to achieve a uniform property of the optical transmitter over the entire frequency region.

Incidentally, use of the weighted capacitance element and resistance element for αCm and Rm/α on the MSB side makes it possible to obtain the same uniform responsivity as that on the LSB side. In the configuration in FIG. 10, a necessary bias current is supplied via the added resistances Rm and Rm/α, and thus the bias voltage is changed to Vb=2.1 V. Incidentally, in the configuration in FIG. 10, the resistance elements via which the DC potential on the signal input side is grounded to the ground potential in FIG. 8 are no longer needed.

In the optical transmitter according to the this example, the respective binary signals of the MSB and the LSB are synthesized into the multilevel signal beforehand via the first capacitance elements 28a, 29a to be input to the single first phase shifter 32a. Similarly, the respective binary signals of the MSB and the LSB are synthesized into the multilevel signal beforehand via the second capacitance elements 28b, 29b to be input to the single second phase shifter 32b. This configuration prevents a signal delay from occurring in the phase shifters 32a, 32b, and does not need to adjust the signal delay between segmented phase shifters, which has been the problem in the prior arts. Therefore, it is not necessary to provide various mechanisms intended for the delay amount adjustment, resulting in that it is possible to fundamentally avoid the increase in scale of the transmitter and the increase in power consumption, which have been the problems in the prior arts.

In this example, line lengths of internal signal lines are designed to be equal to each other between the MSB driver 21 and the LSB driver 22. Further, the line length of the signal line where the signals are output from the drivers 21, 22 and pass through the first capacitance elements 28a, 29a to be synthesized and the line length of the signal line where the signals are output from the drivers 21, 22 and pass through the second capacitance elements 28b, 29b to be synthesized are designed to be equal to each other. This makes it possible to generate the multilevel signals with no timing differences between the phase shifters 32a and 32b without performing a special phase adjustment.

Figure 11:
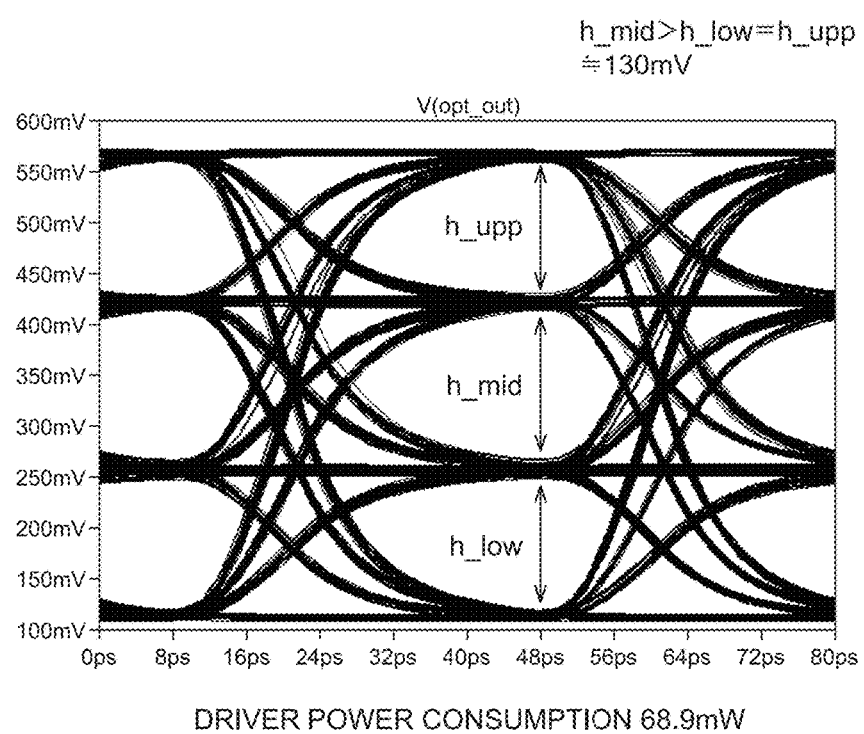
FIG. 11 is a characteristic chart illustrating output waveforms of PAM4 in the optical transmitter according to the example 2 of the first embodiment.

FIG. 11 is a characteristic chart illustrating output waveforms of 25 Gbaud PAM4 in the optical transmitter in the example 2 of the first embodiment.

In FIG. 11, similarly to the example 1, main waveforms multiplexed to four levels are obtained and sufficient eye opening widths are secured without a special delay adjustment. Respective eye openings have a height of about 130 mV or so (=an optical amplitude of about 130 µW) or more, and modulated optical waveforms of PAM4, which are larger in amplitude and higher in quality, are obtained in spite of being a smaller modulator having a shorter phase shifter length as compared to the example 1. This is because the efficiency of the phase shifters 32a, 32b having a pin structure is higher than that of the phase shifters 27a, 27b having a pn structure in the example 1. The power consumption in the driving unit 10 in this example is 68.9 mW and a PAM4 optical transmitter that is much lower in power and higher in efficiency than those of the example 1 is fabricated. This is because each equivalent capacitance $C_F$ of the phase shifters 32a, 32b having a pin structure is much larger than the electric capacity of the capacitance element, and the input impedance of the phase shifter viewed from the driving driver is much smaller than the input impedance to the other driver side (input impedance when viewing the other driver via the capacitance elements), and a large part of drive current supplied from the driving unit 10 becomes an active current to flow into the phase shifters 32a, 32b.

Figure 12:
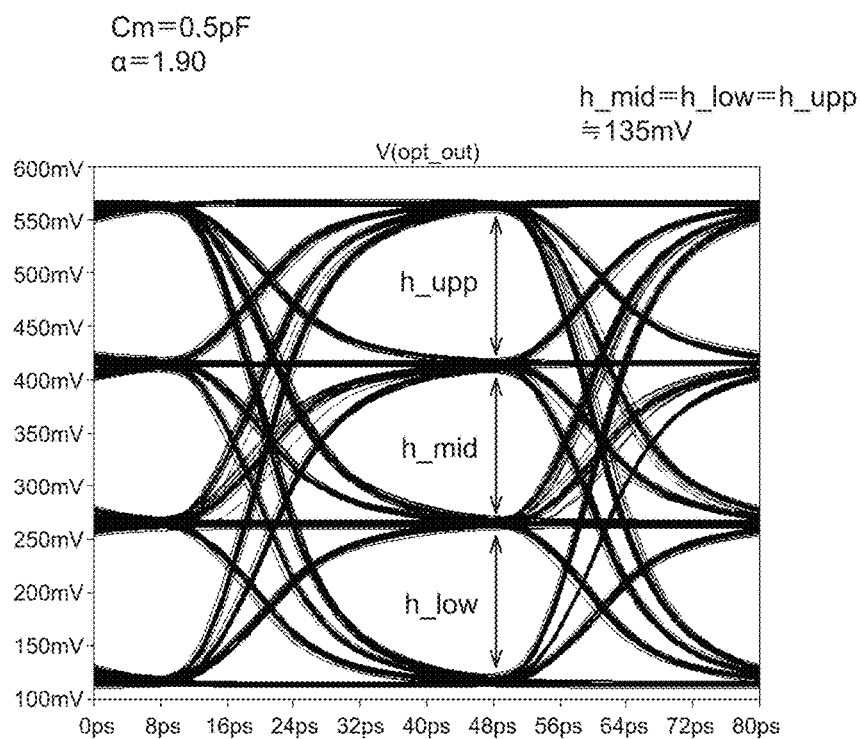
FIG. 12 is a characteristic chart illustrating output waveforms of PAM4 of the case where a weighting parameter α is adjusted in the optical transmitter according to the example 2 of the first embodiment.

Further, in the output waveforms in FIG. 11, the middle eye height h_mid is slightly larger than the upper and lower eye heights h_upp, h_low, and a slight uneven amplitude distribution is exhibited. This is because of the effects of electrical nonlinearity of the MSB driver 21, the LSB driver 22, and the phase shifters 32a, 32b and response function nonlinearity of the MZ optical modulator 20. In order to obtain better reception characteristics, a weighting parameter α is adjusted to, for example, 1.9 from 2.0, as illustrated in FIG. 12, thereby making it possible to uniformize the heights of the respective eye openings. As a method of adjusting the weighting parameter, α on the MSB side may be reduced, or α on the LSB side may be increased.

As explained above, according to the optical transmitter in this example, since segmenting of the phase shifters is not needed, the optical transmission of high-quality multilevel optical signals is performed without occurrence of the signal delay resulting from segmenting. Furthermore, according to the optical transmitter in this example, there is fabricated an optical transmitter that is larger in modulation amplitude and smaller in power consumption than the optical transmitter in the example 1, for example.

Figure 13:
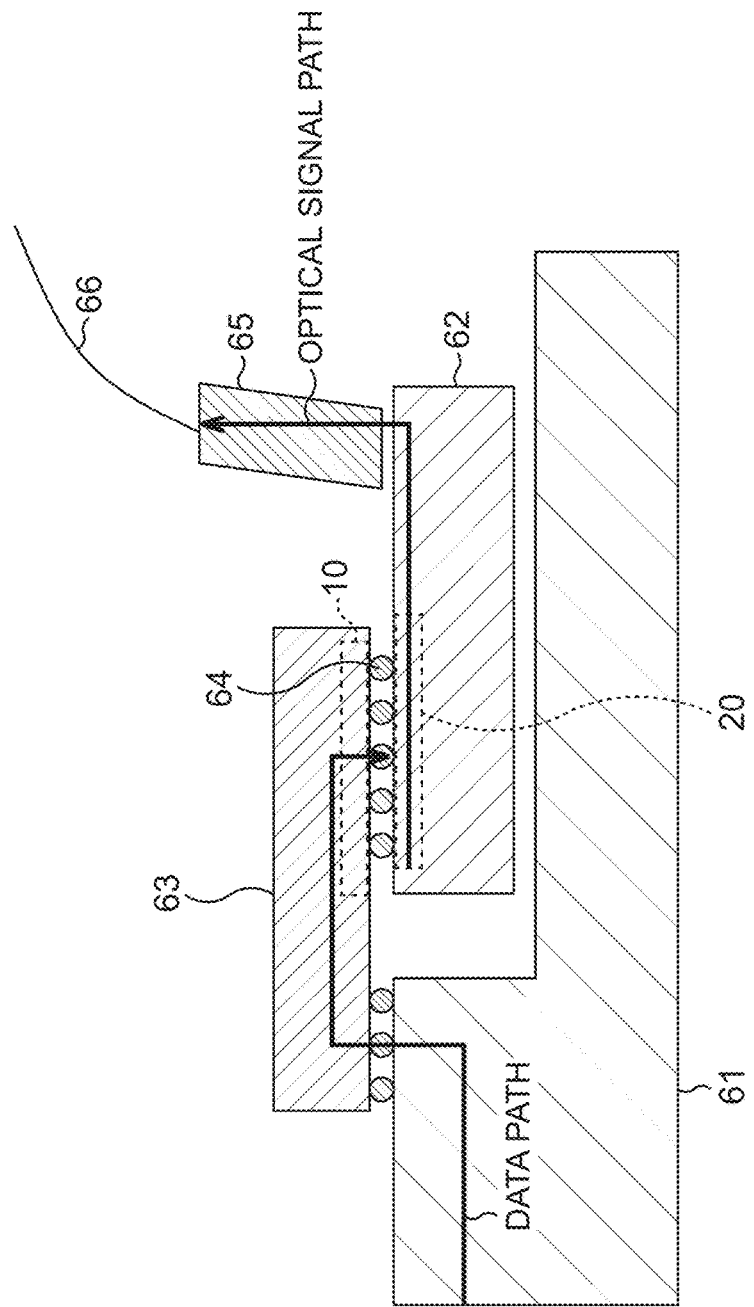
FIG. 13 is a schematic cross-sectional view illustrating a state where the optical transmitter according to the example 1 or 2 of the first embodiment is mounted on a substrate.

One type of the optical transmitter selected from the examples 1, 2 is mounted on a substrate as illustrated in FIG. 13, for example.

In FIG. 13, an optical modulator chip 62 and a driving unit chip 63 are mounted on a package substrate 61. In the optical modulator chip 62, the MZ optical modulator 20 in the optical transmitter of one type selected from the examples 1, 2 is integrated. In the driving unit chip 63, the driving unit 10 of the relevant optical transmitter is integrated. The driving unit 10 and the MZ optical modulator 20 are electrically connected by solder bumps 64, for example. Here, the capacitance unit 30 of the relevant optical transmitter is integrated in one of the optical transmitter chip 62 and the driving unit chip 63.

Figure 14:
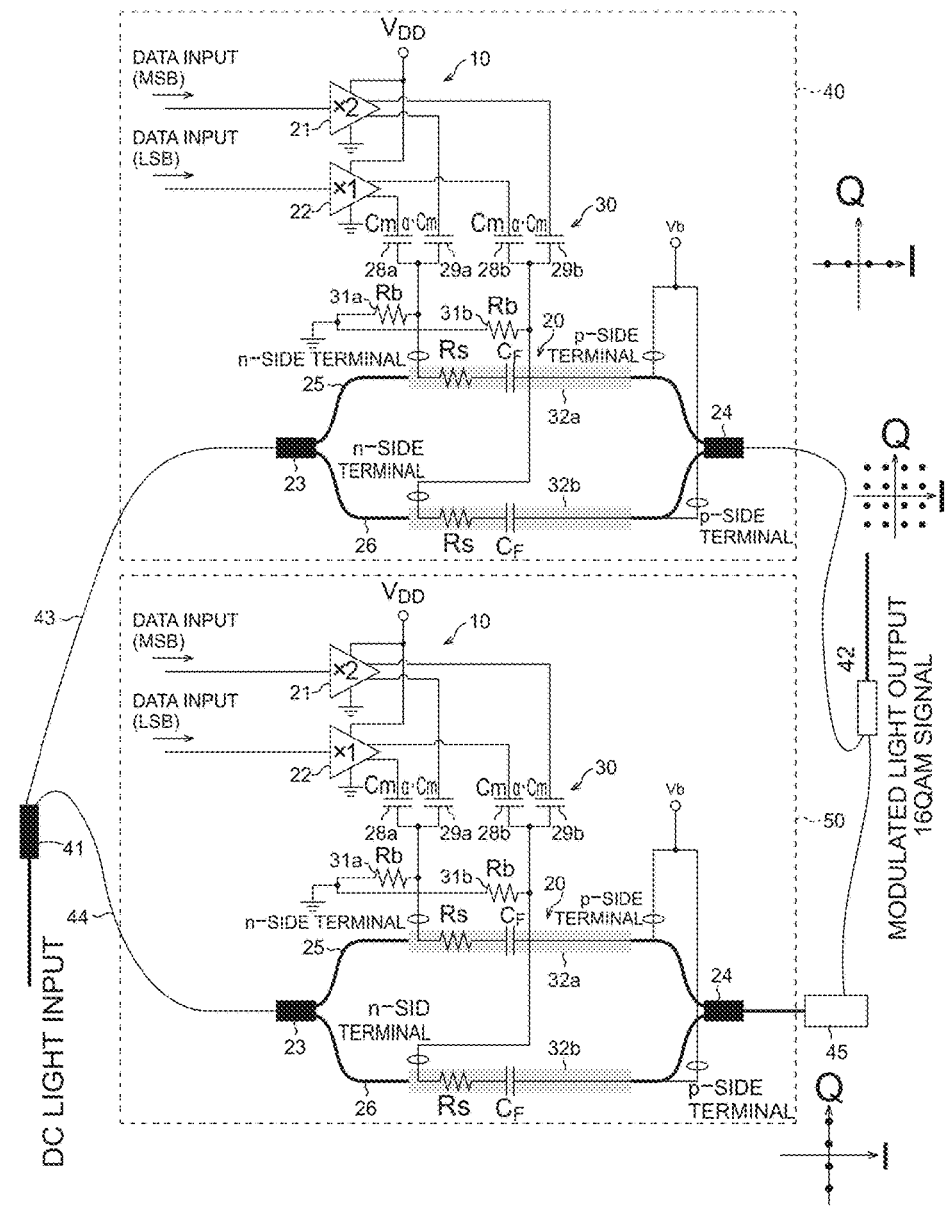
FIG. 14 is a schematic diagram illustrating a schematic configuration of an optical transmitter according to an example 3 of the first embodiment.

FIG. 14 is a schematic diagram illustrating a schematic configuration of an optical transmitter according to an example 3 of the first embodiment.

In this example, there is explained as an example, an optical transmitter that performs optical modulation of 16QAM (Quadrature Amplitude Modulation) having four levels in each quadrature direction (I, Q) of an optical signal.

This optical transmitter includes an I modulator 40 and a Q modulator 50, and is a nested MZ modulator in which a 90° optical phase shifter 45 is connected to the Q modulator 50. One type of the optical transmitter selected from the examples 1, 2 is used for the I modulator 40 and the Q modulator 50. In this example, the case of the optical transmitter in the example 2 being used is explained as an example.

The optical transmitter has one end thereof set as an input portion of a DC light and has the other end thereof set as an output portion of a 16QAM signal, and includes arms 43, 44 that are a pair of optical waveguides to separate from each other at an optical coupler 41 on the input side and optically couple to each other at an optical coupler 42 on the output side. To the arm 43, optical couplers 23, 24 in the I modulator 40 are connected. An optical coupler 23 in the Q modulator 50 is connected to the input side of the arm 44, and an optical coupler 24 is connected to the output side of the arm 44 via the 90° optical phase shifter 45. A multilevel optical signal in the I modulator 40 and a multilevel optical signal that has passed through the 90° optical phase shifter 45 of the Q modulator 50 are synthesized, to thereby generate a 16QAM signal having 16 levels of 4×4 in a complex phase plane.

In this example, in both the I modulator 40 and the Q modulator 50, line lengths of internal signal lines are designed to be equal to each other between the MSB driver 21 and the LSB driver 22. Further, the line length of the signal line where the signals are output from the drivers 21, 22 and pass through the first capacitance elements 28a, 29a to be synthesized and the line length of the signal line where the signals are output from the drivers 21, 22 and pass through the second capacitance elements 28b, 29b to be synthesized are designed to be equal to each other. That is, the line lengths of the four signal lines where the signals are output from the MSB drivers in the I modulator 40 and the Q modulator 50 and pass through the capacitance elements to be synthesized are all designed to be equal to one another. This configuration makes it possible to generate the multilevel signals with no timing differences among the four phase shifters 32a, 32b in the I modulator 40 and the Q modulator 50 without performing a special phase adjustment.

According to this example, it is possible to perform 16QAM optical modulation that is more multilevel and larger in capacity by using the optical transmitter capable of obtaining optical transition of a high-quality multilevel optical signal without occurrence of a signal delay resulting from segmenting of the phase shifters.

Second Embodiment

Figure 15:
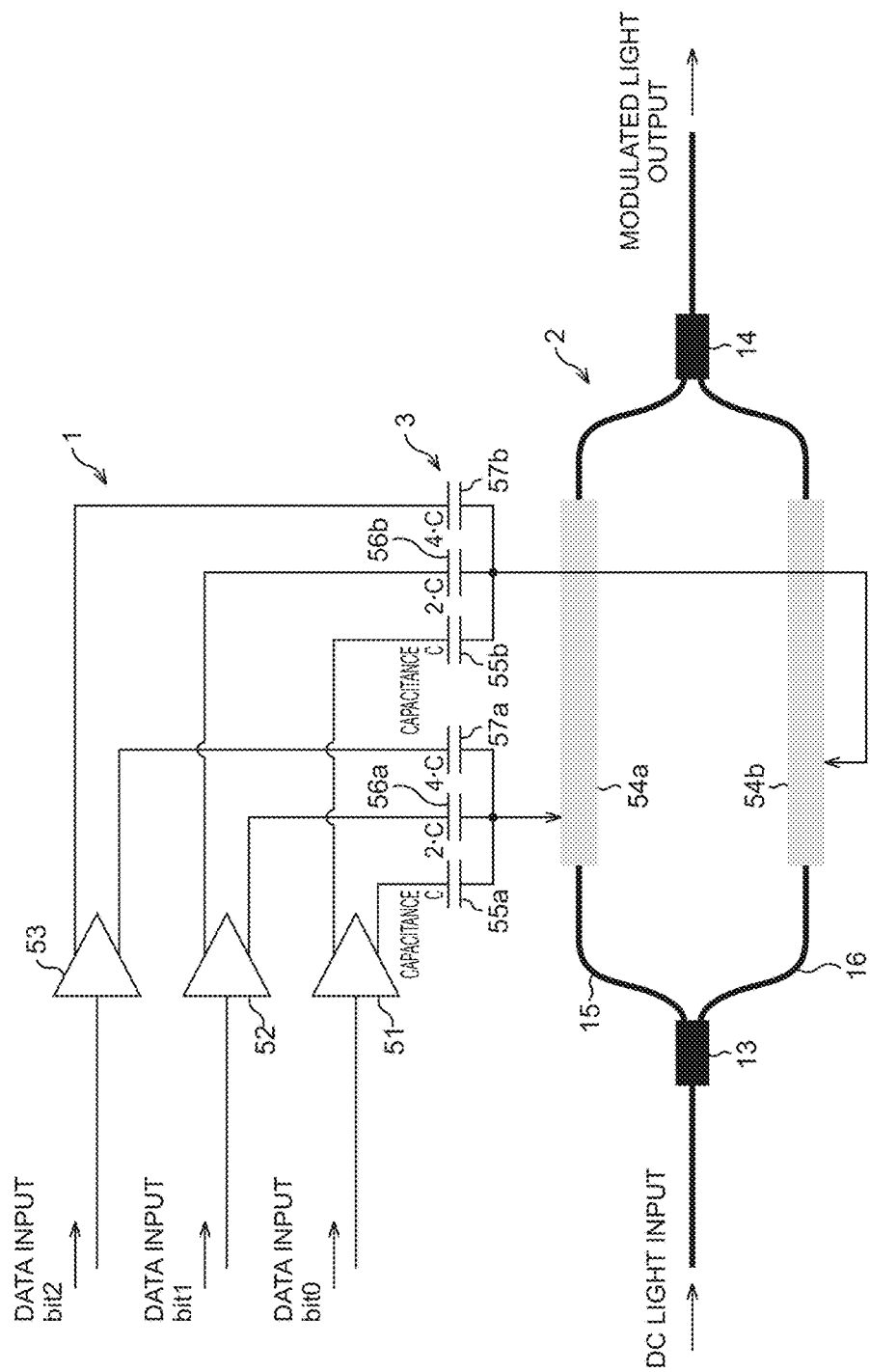
FIG. 15 is a schematic diagram illustrating a schematic configuration of an optical transmitter according to a second embodiment.

In this embodiment, there is explained as an example, a PAM8 optical transmitter that generates a multilevel modulated signal encoded in two bits or more, three bits here, per one symbol. FIG. 15 is a schematic diagram illustrating a schematic configuration of an optical transmitter according to a second embodiment.

This optical transmitter includes a driving unit 1, a MZ optical modulator 2, and a capacitance unit 3.

The driving unit 1 includes a bit0 driver 51, a bit1 driver 52, and a bit2 driver 53 that are CMOS inverters to amplify binary signals of the bit0, the bit1, and the bit2, which are configuration bits of an input electrical data sequence, and output the amplified binary signals respectively.

The MZ optical modulator 2 has one end thereof set as an input portion of a DC light and has the other end thereof set as an output portion of a multilevel optical signal, and includes arms 15, 16 that are a pair of optical waveguides to separate from each other at an optical coupler 13 on the input side and optically couple to each other at an optical coupler 14 on the output side. A first phase shifter 54a is loaded in the arm 15, and a second phase shifter 54b is loaded in the arm 16. In this embodiment, the phase shifters 54a, 54b are the same in size and material, and each are an undivided single segment phase shifter.

The capacitance unit 3 includes first capacitance elements 55a, 56a, and 57a and second capacitance elements 55b, 56b, and 57b. The first capacitance elements 55a, 56a, and 57a are electrically connected between the driving unit 1 and the first phase shifter 54a, and each have an electric capacity weighted in response to a bit number of the configuration bit of the input electrical data sequence. The second capacitance elements 55b, 56b, and 57b are electrically connected between the driving unit 1 and the second phase shifter 54b, and each have an electric capacity weighted in response to a bit number of the configuration bit of the input electrical data sequence. That is, the capacitance elements 55a, 55b each have an electric capacity C ($2^0 \cdot C$) in response to the bit0 (LSB). The capacitance elements 56a, 56b each have an electric capacity 2C ($2^1 \cdot C$) in response to the bit1. The capacitance elements 57a, 57b each have an electric capacity 4C ($2^2 \cdot C$) weighted in response to the bit2 (MSB).

In this optical transmitter, an electrical signal, which is transmission data, is input to the drivers 51, 52, and 53 in the driving unit 1 as a binary signal every bit0, bit1, and bit2 being the configuration bits of the input electrical data sequence. The bit0 driver 51 is electrically connected to the phase shifters 54a, 54b via the capacitance elements 55a, 55b. The bit1 driver 52 is electrically connected to the phase shifters 54a, 54b via the capacitance elements 56a, 56b. The bit2 driver 53 is electrically connected to the phase shifters 54a, 54b via the capacitance elements 57a, 57b.

The drivers 51, 52, and 53 each are a differential amplifier, and one of differential signals amplified in the bit0 driver 51 is input to the first capacitance element 55a and the other of the amplified differential signals is input to the second capacitance element 55b. One of differential signals amplified in the bit1 driver 52 is input to the first capacitance element 56a, and the other of the amplified differential signals is input to the second capacitance element 56b. One of differential signals amplified in the bit2 driver 53 is input to the first capacitance element 57a, and the other of the amplified differential signals is input to the second capacitance element 57b. The ones of these differential signals are synthesized in the first capacitance elements 55a, 56a, and 57a to be a multilevel signal (first multilevel signal), and it is supplied to the first phase shifter 54a. The others of these differential signals are synthesized in the second capacitance elements 55b, 56b, and 57b to be a multilevel signal (second multilevel signal), and it is supplied to the second phase shifter 54b. The phase shifters 54a, 54b modulate each optical phase according to the multilevel signals supplied from the drivers 51, 52, and 53.

Here, the phase shifters 54a, 54b each are set to a single segment (each only need to have a length 7L in order to obtain the same degree of modulation as the optical transmitter illustrated in FIG. 1). The drivers 51, 52, and 53 taking charge of the respective configuration bits are connected in parallel to the first phase shifter 54a via the first capacitance elements 55a, 56a, and 57a. Similarly, the drivers 51, 52, and 53 taking charge of the respective configuration bits are connected in parallel to the second phase shifter 54b via the second capacitance elements 55b, 56b, and 57b. Therefore, a shift amount of the optical phase to be changed by each of the signals of the bit0, the bit1, and the bit2 results in 4C:2:C=4:2:1, and the following is obtained as the entire optical phase change $\phi(t)$.

$$\phi(t) = 2^2 \cdot bit2(t) + 2^1 \cdot bit1(t) + 2^0 \cdot bit0(t)$$

With $\phi(t)$, the modulated signal results in eight values of 0, 1, 2, 3, 4, 5, 6, and 7. The MZ optical modulator 2 has a function of changing each phase change in the arms 15, 16 into an optical intensity change. An output optical signal to be obtained consequently results in eight-level PAM8 responsive to $\phi(t)$.

In the optical transmitter according to this embodiment, the respective binary signals of the bit0, the bit1, and the bit2 are synthesized into the multilevel signal beforehand via the first capacitance elements 55a, 56a, and 57a, to be input to the single first phase shifter 54a. Similarly, the respective binary signals of the bit0, the bit1, and the bit2 are synthesized into the multilevel signal beforehand via the second capacitance elements 55b, 56b, and 57b, to be input to the single second phase shifter 54b. This configuration prevents a signal delay from occurring in the phase shifters 54a, 54b, and does not need to adjust the signal delay between segmented phase shifters, which has been the problem in the prior arts. Therefore, it is not necessary to provide various mechanisms intended for the delay amount adjustment, resulting in that it is possible to fundamentally avoid the increase in scale of the transmitter and the increase in power consumption resulting from this increase, which have been the problems in the prior arts.

In this example, line lengths of internal signal lines are designed to be equal to one another among the drivers 51, 52, and 53. Further, the line length of the signal line where the signals are output from the drivers 51, 52, and 53 and pass through the first capacitance elements 55a, 56a, and 57a to be synthesized and the line length of the signal line where the signals are output from the drivers 51, 52, and 53 and pass through the second capacitance elements 55b, 56b, and 57b to be synthesized are designed to be equal to each other. This makes it possible to generate the multilevel signals with no timing differences between the phase shifters 54a, 55b without performing a special phase adjustment.

As explained above, according to the optical transmitter in this embodiment, since segmenting of the phase shifters is not needed, the optical transmission of high-quality multilevel optical signals is performed without occurrence of the signal delay resulting from segmenting.

Incidentally, also in the second embodiment, similarly to the examples 1, 2 of the first embodiment, weighting in response to a bit number may be performed on the driver size of the driving unit 1, first and second resistance elements may be added, and a configuration in which the phase shifters each have a pin structure or the like may be applied appropriately.

Further, in the first and second embodiments, the PAM4 or PAM8 optical transmitter that generates a multilevel modulated signal encoded in two bits or three bits per one symbol has been explained as an example, but the embodiments may also be applied to a multilevel optical transmitter of four bits or more. In an n-bit (n=2, 3, . . . ) optical transmitter, a weighting coefficient of the capacitance elements in the capacitance unit is $2^n$, $2^{(n-1)}$, $2^{(n-2)}$, . . . , 1 in the order from the MSB. In this optical transmitter, binary signals are amplified every configuration bit in the driving unit, and then all the signals are electrically synthesized via the weighted capacitance elements to be input to the single phase shifters in the MZ optical modulator, and a multilevel intensity-modulated light is obtained.

Third Embodiment

In this embodiment, there is explained as an example, an optical modulator module including the optical transmitter of one type selected from the first embodiment (including the examples 1 to 3) and the second embodiment (to be referred to as the relevant optical transmitter, hereinafter).

Figure 16:
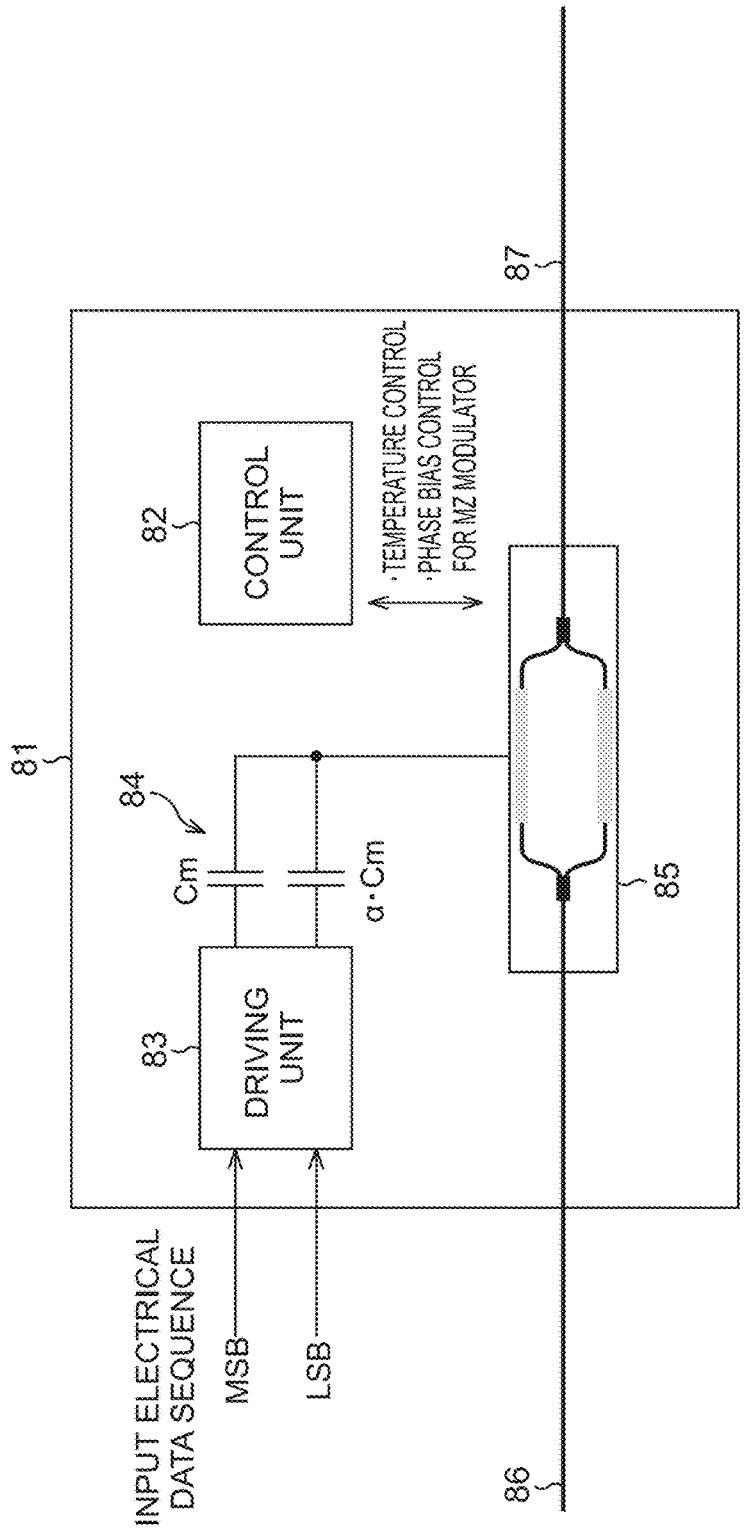
FIG. 16 is a schematic diagram illustrating a schematic configuration of an optical modulator module according to a third embodiment.

FIG. 16 is a schematic diagram illustrating a schematic configuration of an optical modulator module according to a third embodiment.

The optical modulator module includes the relevant optical transmitter and a control unit 82 therefor arranged in a module casing 81.

The relevant optical transmitter includes a driving unit 83 including the above-described drivers to which respective configuration bits of an input electrical data sequence are input, a capacitance unit 84 including the above-described capacitance elements, and a Si-MZ optical modulator chip 85 including the above-described MZ optical modulator. An input optical fiber 86 and an output optical fiber 87 are connected to the Si-MZ optical modulator chip 85.

The control unit 82 includes a temperature control mechanism for the Si-MZ optical modulator chip 85, a phase bias control mechanism for the phase shifters in the Si-MZ optical modulator chip 85, and so on. An optical detector for a control monitor of these control mechanisms and a DC phase shifter are integrated in the Si-MZ optical modulator chip 85 as necessary.

According to this embodiment, a highly reliable high-quality optical modulator module is fabricated by using the optical transmitter capable of obtaining optical transmission of high-quality multilevel optical signals without occurrence of the signal delay resulting from segmenting of the phase shifter.

Fourth Embodiment

In this embodiment, there is explained as an example, an optical transmission system including the optical transmitter of one type selected from the first embodiment (including the examples 1 to 3) and the second embodiment (to be referred to as the relevant optical transmitter, hereinafter).

Figure 17:
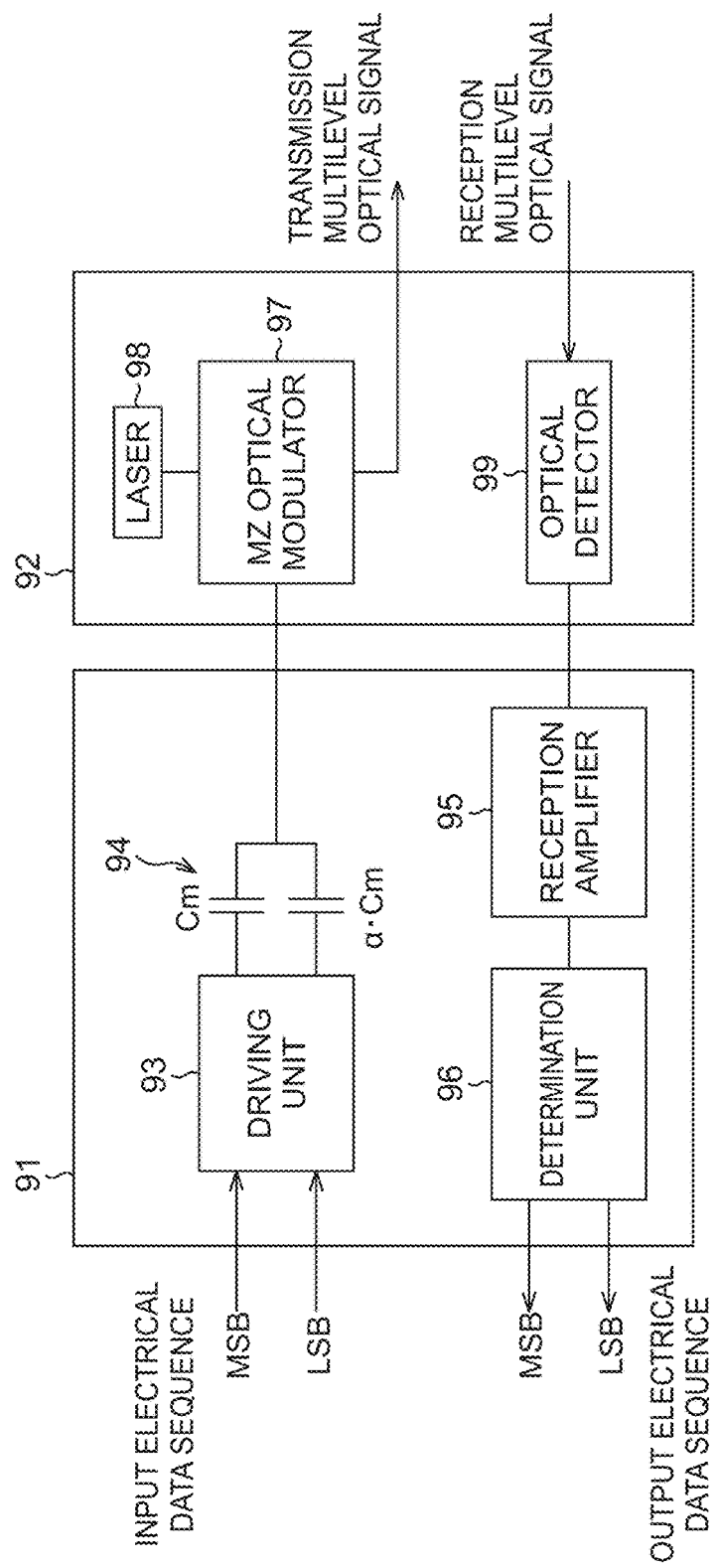
FIG. 17 is a schematic diagram illustrating a schematic configuration of an optical transmission system according to a fourth embodiment.

FIG. 17 is a schematic diagram illustrating a schematic configuration of an optical transmission system according to a fourth embodiment.

This optical transmission system includes an electronic circuit chip 91 and a Si-integrated optical circuit chip 92, in which the relevant optical transmitter and an optical receiver are included.

In the electronic circuit chip 91, a driving unit 93 including the drivers of the relevant optical transmitter, a capacitance unit 94 including the capacitance elements of the relevant optical transmitter, a reception amplifier 95 of a multilevel electrical signal, and a determination unit 96 are integrated.

In the Si-integrated optical circuit chip 92, a MZ optical modulator 97 of the relevant optical transmitter, a laser 98 connected to the MZ optical modulator 97, and an optical detector 99 are integrated.

In this optical transmission system, the relevant optical transmitter includes the driving unit 93 and the capacitance unit 94 in the electronic circuit chip 91 and the MZ optical modulator 97 in the Si-integrated optical circuit chip 97. The optical receiver includes the optical detector 99 in the Si-integrated optical circuit chip 92 and the reception amplifier 95 and the determination unit 96 in the electronic circuit chip 91.

In the relevant optical transmitter, respective configuration bits of an input electrical data sequence are input to the corresponding drivers in the driving unit 93 to be synthesized into a multilevel signal in the capacitance unit 94, this multilevel signal is modulated into a multilevel modulated light in the MZ optical modulator 97, and a transmission multilevel optical signal is output.

In the optical receiver, a reception multilevel optical signal is input to the optical detector 99, to be converted into a multilevel electrical signal in the optical detector 99. This multilevel electrical signal is amplified to a necessary voltage level in the reception amplifier 95, the level of the multilevel electrical signal is determined in the determination unit 96, and the multilevel electrical signal is decomposed into binary signals corresponding to the respective configuration bits to be output as an output electrical data sequence.

According to this embodiment, a highly reliable high-quality optical transmission system is fabricated with the optical receiver by using the optical transmitter capable of obtaining optical transmission of high-quality multilevel optical signals without occurrence of the signal delay resulting from segmenting of the phase shifter.

Although the CMOS inverter has been explained as the driver configuring the driving unit in the first to fourth embodiments (including the examples 1 to 3 of the first embodiment), the driver is not limited to this. Even when drivers in a different system such as CML are used in place of the invertors, for example, the optical transmitter can be fabricated by appropriately adjusting the capacitance elements and the resistance elements. Further, although the optical modulator formed on the Si substrate has been explained as an example, the optical modulator is not limited to this. An optical modulator may be configured by using an InP substrate or the like, in place of the Si substrate, for example.

In one aspect, since segmenting of the phase shifters is not needed, an optical transmitter enabling optical transmission of a high-quality multilevel optical signal, and an optical modulator module and an optical transmission system using this optical transmitter are fabricated without occurrence of the signal delay resulting from the segmenting.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmitter that generates a multilevel optical signal of two bits or more from an input optical signal and an input electrical data sequence, the optical transmitter comprising:
    a driving circuit configured to comprise drivers each corresponding to a configuration bit of the input electrical data sequence;
    an optical modulator configured to have a first optical waveguide and a second optical waveguide optically coupled to each other on an output side and comprise a first phase shifter provided in the first optical waveguide and a second phase shifter provided in the second optical waveguide;
    first capacitance elements configured to be electrically connected between the driving circuit and the first phase shifter, each comprises an electric capacity weighted in response to a bit number of the configuration bit, and generates a first multilevel signal to be supplied to the first phase shifter; and
    second capacitance elements configured to be electrically connected between the driving circuit and the second phase shifter, each comprises an electric capacity weighted in response to a bit number of the configuration bit, and generates a second multilevel signal to be supplied to the second phase shifter.

2. The optical transmitter, according to claim 1, wherein the drivers each has an output impedance thereof weighted in response to the corresponding bit number.

3. The optical transmitter according to claim 1, further comprising:
    a first resistance element configured to be electrically connected in series to the first capacitance elements; and
    a second resistance element configured to be electrically connected in series to the second capacitance elements.

4. The optical transmitter according to claim 1, further comprising:
    a third resistance element configured to comprise a resistance weighted inversely to the weighting of the first capacitance elements in parallel to the first capacitance elements; and
    a fourth resistance element configured to comprise a resistance weighted inversely to the weighting of the second capacitance elements in parallel to the second capacitance elements.

5. The optical transmitter according to claim 1, wherein the first phase shifter and the second phase shifter each has a forward bias applied thereto to accumulate carriers, to thereby have an electric capacity larger than the electric capacity of the capacitance elements.

6. The optical transmitter according to claim 1, wherein in the first capacitance elements and the second capacitance elements, the electric capacities are adjusted to be able to obtain an equal interval among levels of the multilevel optical signal by compensating nonlinearity of the drivers, nonlinearity of the phase shifters, and response nonlinearity of the optical modulator.

7. The optical transmitter according to claim 1, further comprising:
    a substrate;
    a first chip configured to be mounted on the substrate and in which the driving unit is integrated; and
    a second chip configured to be mounted on the substrate and in which the optical modulator is integrated.

8. The optical transmitter according to claim 7, wherein the first capacitance elements and the second capacitance elements are integrated in the first chip.

9. The optical transmitter according to claim 7, wherein the first capacitance elements and the second capacitance elements are integrated in the second chip.

10. An optical modulator module, comprising:
    a casing;
    an optical transmitter configured to be provided in the casing and generate a multilevel optical signal of two bits or more from an input optical signal and an input electrical data sequence; and
    a controller of the optical transmitter, wherein the optical transmitter comprises:
        a driving circuit configured to comprise drivers each corresponding to a configuration bit of the input electrical data sequence;
        an optical modulator configured to have a first optical waveguide and a second optical waveguide optically coupled to each other on an output side and comprise a first phase shifter provided in the first optical waveguide and a second phase shifter provided in the second optical waveguide;
        first capacitance elements configured to be electrically connected between the driving circuit and the first phase shifter, each comprises an electric capacity weighted in response to a bit number of the configuration bit, and generate a first multilevel signal to be supplied to the first phase shifter; and second capacitance elements configured to be electrically connected between the driving circuit and the second phase shifter, each comprises an electric capacity weighted in response to a bit number of the configuration bit, and generate a second multilevel signal to be supplied to the second phase shifter.

11. An optical transmission system, comprising:

an optical transmitter configured to generate a transmission multilevel optical signal of two bits or more from an input optical signal and an input electrical data sequence; and an optical receiver configured to generate an output electrical data sequence from a reception multilevel optical signal of two bits or more, wherein the optical transmitter comprises:

a driving circuit configured to comprise drivers each corresponding to a configuration bit of the input electrical data sequence;

an optical modulator configured to have a first optical waveguide and a second optical waveguide optically coupled to each other on an output side and comprise a first phase shifter provided in the first optical waveguide and a second phase shifter provided in the second optical waveguide;

first capacitance elements configured to be electrically connected between the driving circuit and the first phase shifter, each comprises an electric capacity weighted in response to a bit number of the configuration bit, and generates a first multilevel signal to be supplied to the first phase shifter; and second capacitance elements configured to be electrically connected between the driving circuit and the second phase shifter, each comprises an electric capacity weighted in response to a bit number of the configuration bit, and generates a second multilevel signal to be supplied to the second phase shifter.

* * * * *